(12) United States Patent
Umino et al.

(10) Patent No.: US 12,374,971 B2
(45) Date of Patent: Jul. 29, 2025

(54) CONDUCTOR FORMING DEVICE

(71) Applicant: HONDA MOTOR CO., LTD., Tokyo (JP)

(72) Inventors: Shunichi Umino, Tokyo (JP); Mitsuhiro Yamada, Tokyo (JP)

(73) Assignee: HONDA MOTOR CO., LTD, Tokyo (JP)

( * ) Notice: Subject to any disclaimer, the term of this patent is extended or adjusted under 35 U.S.C. 154(b) by 493 days.

(21) Appl. No.: 18/047,280

(22) Filed: Oct. 18, 2022

(65) Prior Publication Data
US 2023/0155459 A1    May 18, 2023

(30) Foreign Application Priority Data

Nov. 16, 2021    (JP) .................................. 2021-186580

(51) Int. Cl.
| | |
|---|---|
| *B23P 19/00* | (2006.01) |
| *H01F 41/061* | (2016.01) |
| *H02K 15/0421* | (2025.01) |
| *H02K 15/043* | (2025.01) |

(52) U.S. Cl.
CPC ....... *H02K 15/0421* (2013.01); *H01F 41/061* (2016.01); *H02K 15/0433* (2025.01)

(58) Field of Classification Search
CPC ............ H02K 15/0421; H02K 15/0433; H01F 41/061; H01F 41/071
See application file for complete search history.

(56) References Cited

U.S. PATENT DOCUMENTS

| | | | | |
|---|---|---|---|---|
| 8,082,770 B2 * | 12/2011 | Bowman | ............ | H02K 15/0421 72/379.6 |
| 11,646,646 B2 * | 5/2023 | Ide | .......................... | H02K 3/12 29/596 |
| 2010/0077599 A1 * | 4/2010 | Tokizawa | ........... | H02K 15/0433 29/596 |

FOREIGN PATENT DOCUMENTS

| | | |
|---|---|---|
| JP | S5729939 B2 | 6/1982 |
| JP | 2015047059 A | 3/2015 |
| JP | 2016140223 A | 8/2016 |
| JP | 2019115160 A | 7/2019 |
| JP | 2021058076 A | 4/2021 |

OTHER PUBLICATIONS

Notification of Reasons for Refusal issued in the JP Patent Application No. 2021-186580, mailed on May 30, 2023.

* cited by examiner

*Primary Examiner* — Paul D Kim
(74) *Attorney, Agent, or Firm* — CKC & PARTNERS CO., LLC

(57) ABSTRACT

A conductor forming device includes a holder that holds a plurality of straight parts of a plurality of conductors while arranging the plurality of straight parts in parallel to each other, the plurality of straight parts forming a group of straight parts the plurality of conductors. The holder includes a fixed block on which a plurality of grooves each having a fixed side contact part capable of contacting with one end in width directions of the straight part are provided at equal intervals, a plurality of movable blocks that are disposed to be movable in the respective grooves on the fixed block and each have a movable side contact pars capable of contacting with an opposite end in the width directions of the straight part, and a driver capable of driving the movable blocks independently from each other.

2 Claims, 28 Drawing Sheets

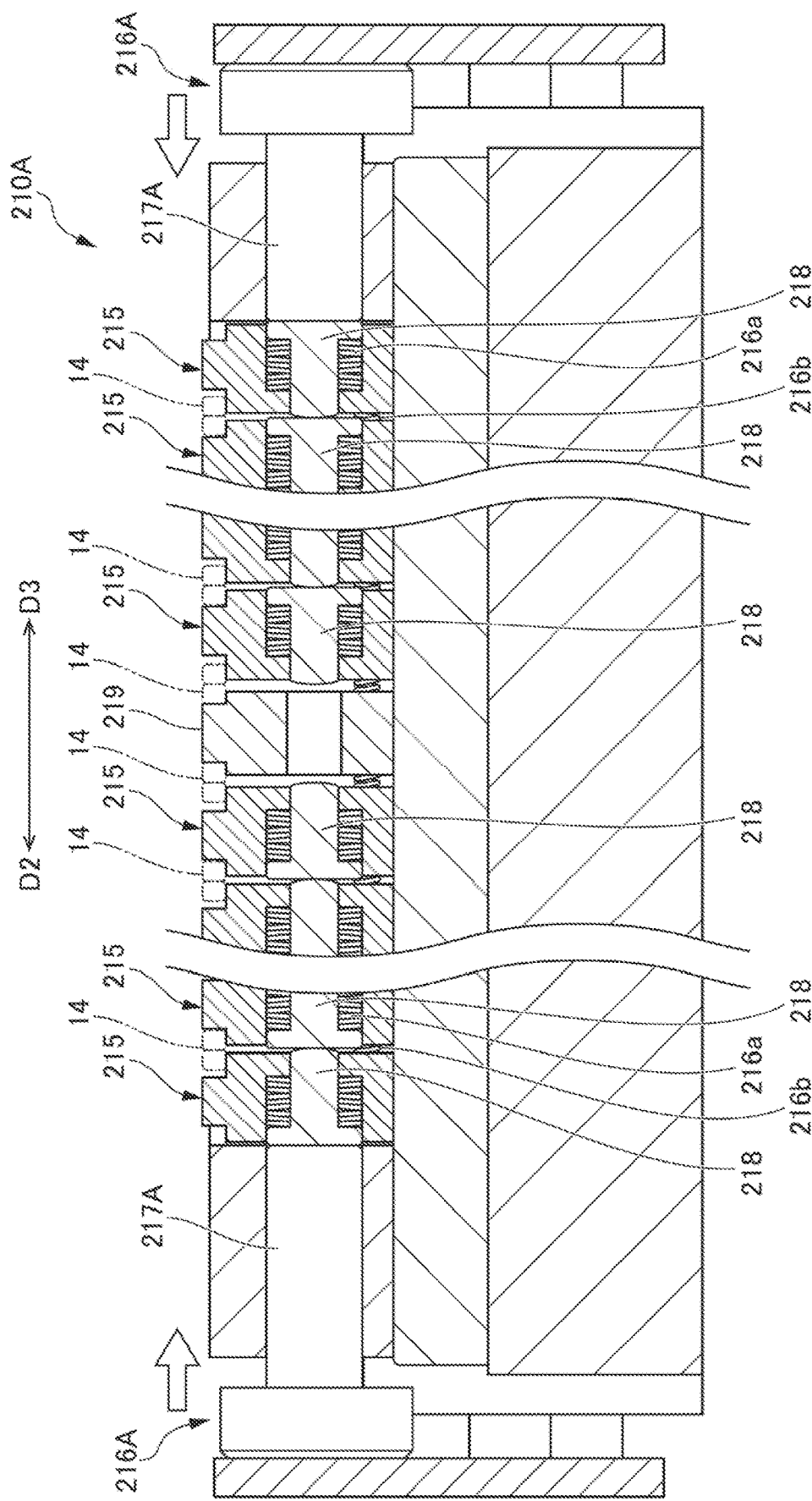

CONDUCTOR FORMING DEVICE

This application is based on and claims the benefit of priority from Japanese Patent Application No. 2021-186580, filed on 16 Nov. 2021, the content of which is incorporated herein by reference.

BACKGROUND OF THE INVENTION

Field of the Invention

The present invention relates to a conductor forming device.

Related Art

A wave winding coil is generally known as a coil included in a stator for a rotary electric machine such as an electric motor and an electric generator that can reduce environmental burden by reduction of $CO_2$ emissions, A wave winding coil has a plurality of straight-shaped, in-slot disposition parts to be disposed in slots of a stator core and a plurality of turning parts each coupling, on an outer side of the stator core in an axial direction, the in-slot disposition parts adjacent to each other in a V or inverted V shape or an arch shape. Thus, the wave winding coil is formed into a wave shape along a circumferential direction of the stator core.

As such a wave winding coil, there is known a long sheet-shaped wave winding coil having a length that is two or more times the length of the circumference of the stator core. The sheet-shaped wave winding coil is spirally wound, and each in-slot disposition part is inserted into corresponding slot of the stator core, whereby a coil having a plurality of layers (a plurality of turns) is formed. The sheet-shaped wave winding coil can be formed into a strip shape without the necessity of welding, and therefore can be reduced in weight in comparison with segment coils requiring welding.

As a method of forming such a sheet-shaped wave winding coil, there has been conventionally known a method of forming turning parts of a winding coil by holding and folding a group of straight parts including straight parts of a plurality of conductors using a holder that holds the group of straight parts such that the plurality of straight parts are arranged in parallel to each other (for example, see Japanese Unexamined Patent Application, Publication No. 2021-58076). The holder disclosed in Japanese Unexamined Patent Application, Publication No. 2021-58076 holds the plurality of straight parts included in the group of straight parts by pinching, between blocks adjacent to each other, the straight parts arranged in parallel to each other.

Patent Document 1: Japanese Unexamined Patent Application, Publication No. 2021-58076

SUMMARY OF THE INVENTION

However, in the above-described holder of the known art, a width of a groove needs to be smaller than a width of the plurality of straight parts included in the group of straight parts in order to firmly hold the straight parts to be inserted into the same slot while being arranged in parallel to each other. In a case where the width of the straight parts is large due to variation in the width of the straight parts, the adjacent blocks are separated from each other due to disposition of the straight parts. This causes an increase in the spacing between the adjacent blocks, resulting in the formation of a gap. As a result, the variation may occur in the interval between the adjacent ones of the plurality of straight parts. This may make it impossible to form a conductor accurately.

An object of the present invention is to provide a conductor forming device that makes it possible to form a conductor accurately while achieving reduction in weight.

A first aspect of the present invention is directed to a conductor forming device (e.g., a conductor forming device 200, which will be described later) including a holder (e.g., a holding device 210, which will be described later) that holds a plurality of straight parts (e.g., straight parts 14, which will be described later) of a plurality of conductors (e.g., coil wires 10, which will be described later) while arranging the plurality of straight parts in parallel to each other, the plurality of straight parts forming a group of straight parts of the plurality of conductors. The holder includes a fixed block (e.g., a fixed block 214, which will be described later) on which a plurality of grooves (e.g., grooves 214a, which will be described later) are provided at equal intervals, the plurality of grooves each having a fixed side contact part (e.g., a fixed side contact part 214e, which will be described later) capable of contacting with one end in width directions of the straight part, a plurality of movable blocks (e.g., movable blocks 215, which will be described later) that are disposed to be movable in the grooves on the fixed block, the plurality of movable blocks each having a movable side contact part (e.g., a movable side contact part 215h, which will be described later) capable of contacting with an opposite end in the width directions of the straight part, and a driver (e.g., a drive mechanism 216, which will be described later) capable of driving the movable blocks independently from each other.

According to the first aspect, the movable blocks are disposed in the grooves while maintaining intervals between the grooves in the fixed block, and the plurality of straight parts included in the group of straight parts of the plurality of conductors are held while contacting with and pressing onto the movable side contact parts of the movable blocks and the fixed side contact parts of the fixed block, whereby the conductors can be firmly fixed between the movable blocks and the fixed blocks. This feature makes it possible to form a high-quality conductor with high accuracy.

A second aspect of the present invention is an embodiment of the first aspect. The conductor forming device according to the second aspect further includes urging parts (e.g., pressing adjustment springs 216a, which will be described later) each of which urges the movable block in an opposite direction to a direction in which the straight part is pinched and pressed between the movable block and the fixed block. The driver drives each of the movable blocks against an urging force of the urging part.

According to the second aspect, the driver is driven against the urging forces of the urging parts that urge the movable blocks, whereby the plurality of straight parts can be firmly pinched between the movable blocks and the fixed block even when there is variation in the widths of the straight parts. This feature makes it possible to form a high-quality conductor with high accuracy.

According to the present invention, it is possible to provide a conductor forming device that makes it possible to form a conductor accurately while achieving reduction in weight.

BRIEF DESCRIPTION OF THE DRAWINGS

FIG. 33 is a diagram illustrating a holding device of a variant.

DETAILED DESCRIPTION OF THE INVENTION

Figure 1:
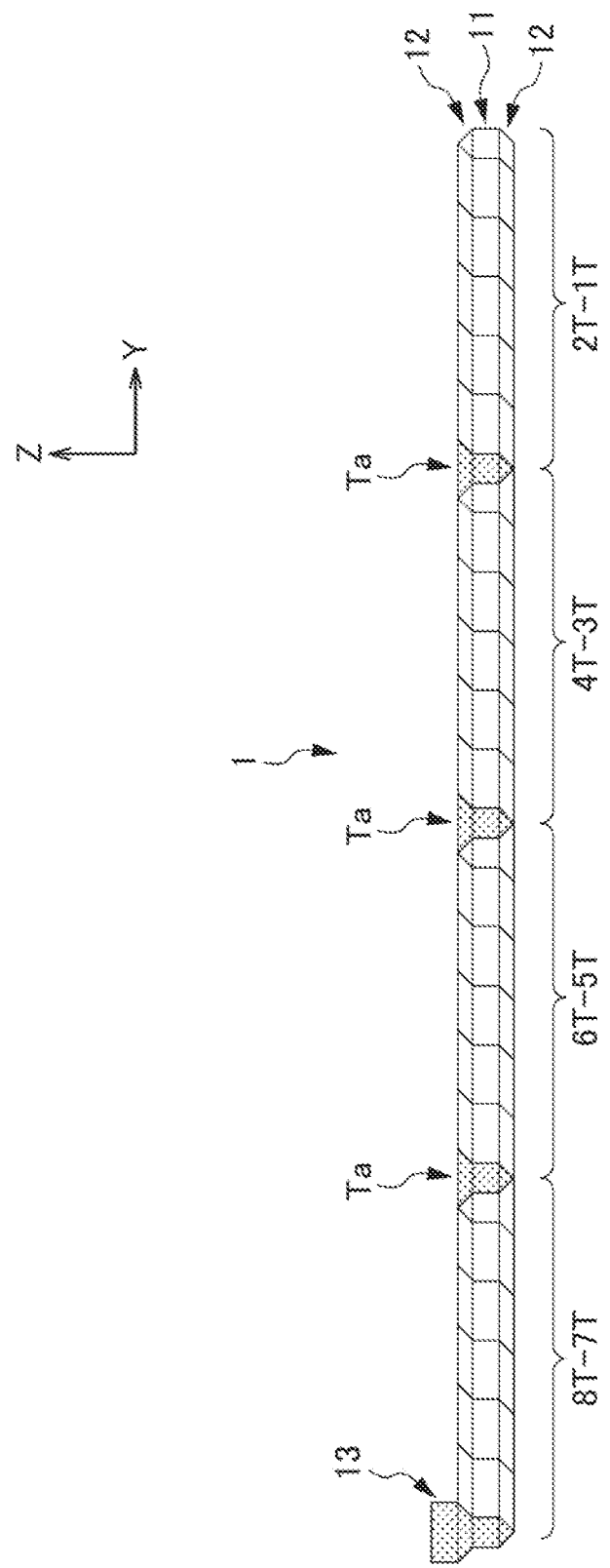
FIG. 1 is a front view schematically illustrating & wave winding coil.

Hereinafter, a method of manufacturing a wave winding coil using a conductor forming device will be described in detail with reference to the accompanying drawings. A wave winding coil and a stator will be first described with reference to FIGS. 1 and 2. A wave winding coil 1 according to the present embodiment is formed, using a plurality of coil wires 10 arranged in parallel to each other, which will be described later, into a long sheet shape extending in Y directions in the figure. The Y directions correspond to circumferential directions of a stator core 20 illustrated in FIG. 2.

A stator 2 includes the stator core 20 and the wave winding coil 1 to be attached to the stator core 20. The stator core 20 has a plurality of teeth 22 radially protruding toward a central axial hole 21. Slots 23 are each formed between the teeth 22 and 22 adjacent to each other. The present embodiment exemplifies the stator core 20 having seventy-two slots 23.

Figure 2:
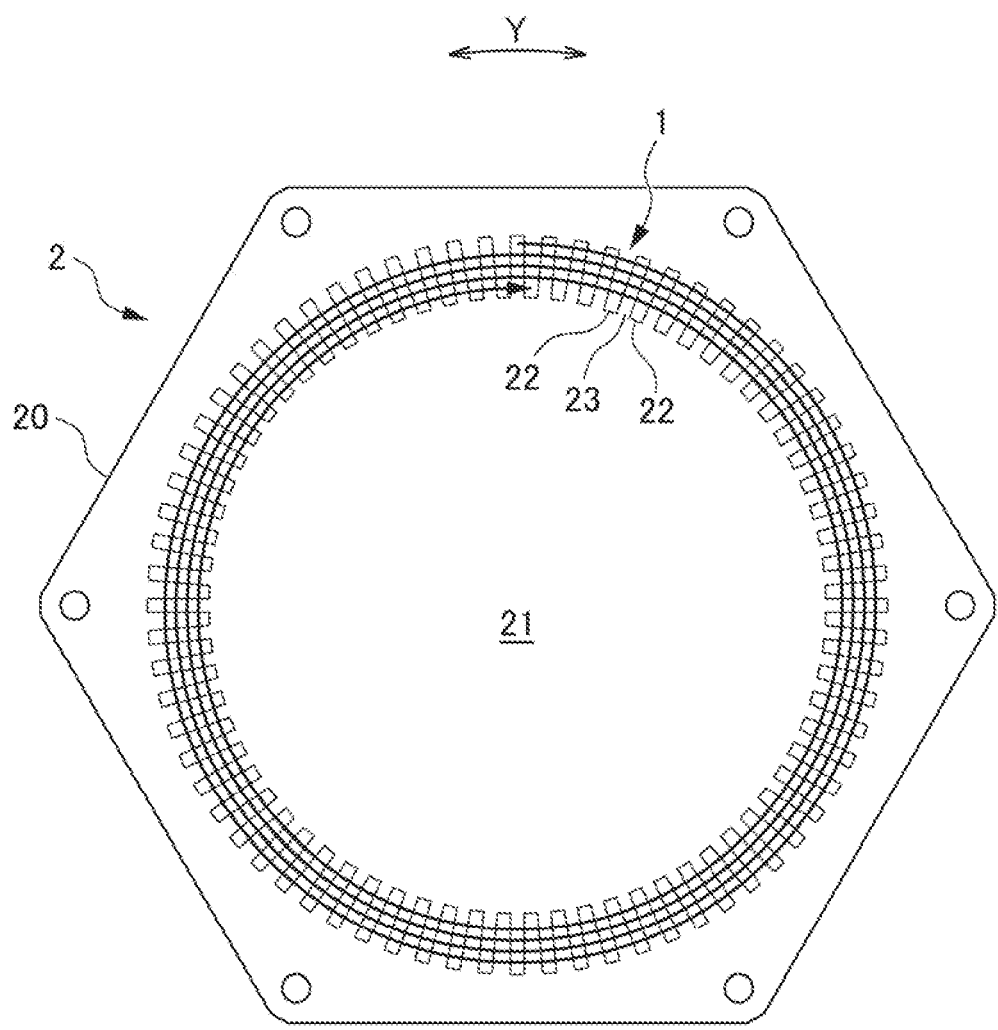
FIG. 2 is a plan view schematically illustrating a stator.

The wave winding coil 1 has a plurality of in-slot disposition parts 11 and a plurality of turning parts 12. The in-slot disposition parts 11 are each a portion to be disposed in the slot 23 of the stator core 20. The in-slot disposition part 11 extends straightforwardly in axial directions (2 directions in FIG. 1) of the stator core 20. The turning parts 12 are each a portion coupling, on an outer side in the axial directions of the stator core 20, the in-slot disposition parts 11 and 11 adjacent to each other of the coil wires 10 in a V or inverted V shape or an arch shape. The wave winding coil 1 has, at one end, a terminal part 13 for use for electrical connection with a driving circuit. Note that, although the in-slot disposition parts 11 and the turning parts 12 of the wave winding coil 1 are formed from the plurality of coil wires 10, FIG. 1 schematically illustrates the in-slot disposition parts 11, the turning parts 12, and the terminal part 13 in plane.

The wave winding coil 1 according to the present embodiment has a length corresponding to four turns around the stator core 20, and forms a coil having eight layers (eight turns) 1 T to 8 T in total, on the stator core 20. Therefore, the wave winding coil 1 forms a coil having two layers (two turns) per turn around the stator core 20, in which layer switching occurs each time the coil is wound around the stator core 20. Reference signs Ta in FIG. 1 indicate layer switching parts disposed between the seventh layer (7 T) and the sixth layer (6 T), between the fifth layer (5 T) and the fourth layer (4 T), and between the third layer (3 T) and the second layer (2 T), respectively.

The wave winding coil 1 is spirally wound in four turns around the stator core 20. The wave winding coil 1 is attached to the stator core 20 by disposing the in-slot disposition parts 11 in the slots 23 of the stator core 20. As a result, the stator 2 is formed. Note that, although an insulator is disposed in each of the slots 23 for insulating the wave winding coil 1 and the stator core 20 from each other, the insulator is not illustrated in FIG. 2.

Figure 3:
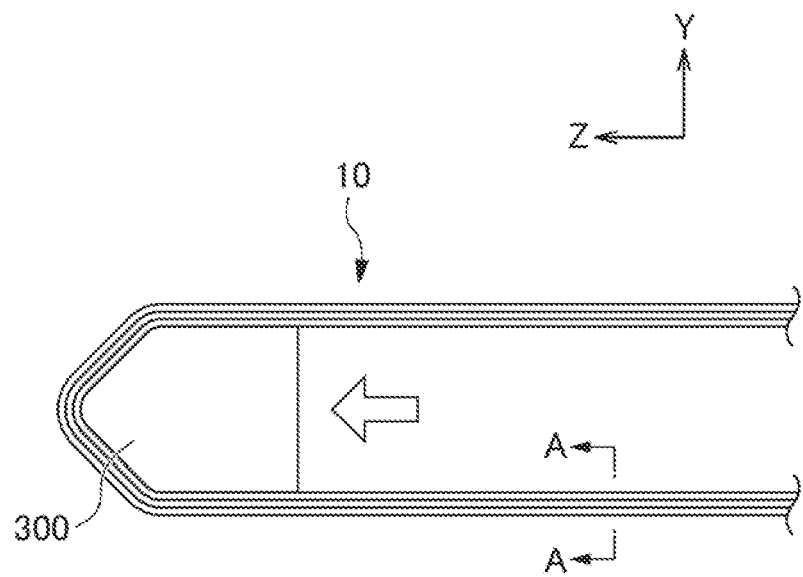
FIG. 3 is a diagram illustrating how a coil wire (conductor) is formed.
Figure 4:
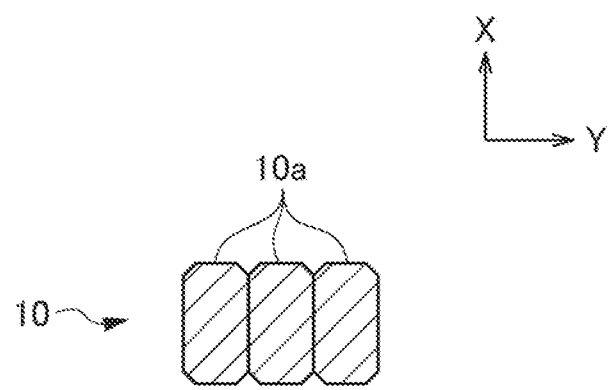
FIG. 4 is a cross-sectional view taken along line A-A in FIG.

Next, each of the coil wires 10 according to an embodiment, which form the wave winding coil 1 will described with reference to FIGS. 3 to 6. The coil wire 10 is an electrical conductor made from a copper wire or the like. The coil wire 10 is first cut into a predetermined length, and then is bent at a substantially center portion in extending directions of the coil wire 10, using an extracting tool 300 that moves in a direction Indicated by a white hollow arrow, as illustrated in FIG. 3. As illustrated in FIG. 4, the coil wire 10 according to the present embodiment includes three unit wires 10a that are flat wires and are arranged in the Y directions. The Y directions correspond to the circumferential directions of the stator core 20. The coil wire 10 is formed by, in a state in which the three unit wires 10a are arranged in the Y directions, integrally bending the three unit wires 10a in the arrangement directions using the extracting tool 300.

Figure 5:
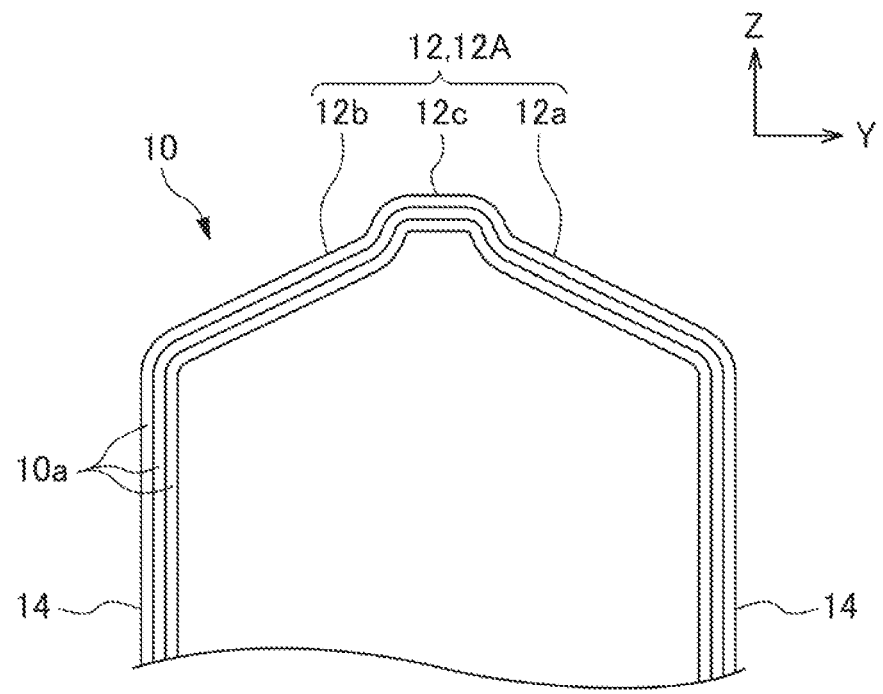
FIG. 5 is a front view illustrating a part of the coil wire (conductor) in an enlarged manner.
Figure 6:
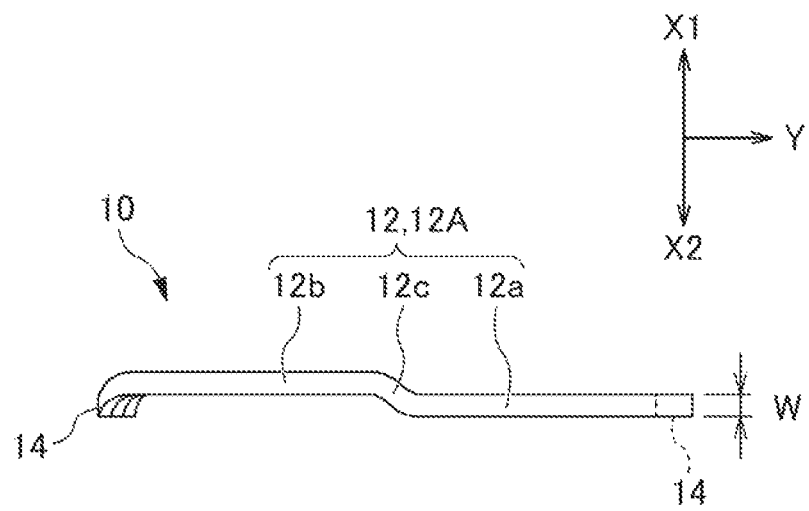
FIG. 6 is a diagram when the coil wire (conductor) illustrated in FIG. 5 is seen in a direction along Z directions.

As illustrated in FIGS. 5 and 6, the coil wire 10 bent using the extracting tool 300 is formed, using a forming die (not shown), into a substantial U-shape having a turning part 12 with a V or inverted V shape and two straight parts 14 and 14 extending in parallel to each other in the same direction from both ends of a first turning part 12A as the turning part 12. Hereafter, the turning part 12 first formed in the coil wire 10 may be referred to as the first turning part 12A. An interval between the two straight parts 14 and 14 of the coil wire 10 according to the present embodiment corresponds to an interval between two slots 23 and 23 which are separated from each other by six slots in the stator core 20.

The first turning part 12A of the coil wire 10 has a first inclined part 12a, a second inclined part 12b, and an apex part 12c, as illustrated in FIGS. 5 and 6. The first inclined part 12a and the second inclined part 12b are integrally coupled to the straight parts 14 and 14, respectively, obliquely extend from the respective coupling portions of the straight parts 14 and 14 in directions in which the first inclined part 12a and the second inclined part 12b come closer to each other, and are then further integrally coupled at the apex part 12c.

As illustrated in FIG. 6, a wire width (a width in the radial direction of the stator core 20) of the coil wire 10 is denoted by W. The first inclined part 12a extends obliquely toward the apex part 12c with respect to the straight part 14 to which the first inclined part 12a is coupled, without being offset in the X directions. On the other hand, the second inclined part 12b is offset by W in an X1 direction with respect to the first inclined part 12a, and then obliquely extends toward the corresponding straight part 14, so that the second inclined part 12b is offset, at the coupling portion with the straight part 14, by W in an X2 direction that is an opposite direction to the X1 direction described above. As a result, the two straight parts 14 and 14 are at the same position in terms of the K directions. That is, the two straight parts 14 and 14 are disposed within a single plane extending in the Y directions. Note that the X directions indicated as the X1 direction and the X2 direction correspond to the radial directions of the stator core 20.

Figure 7:
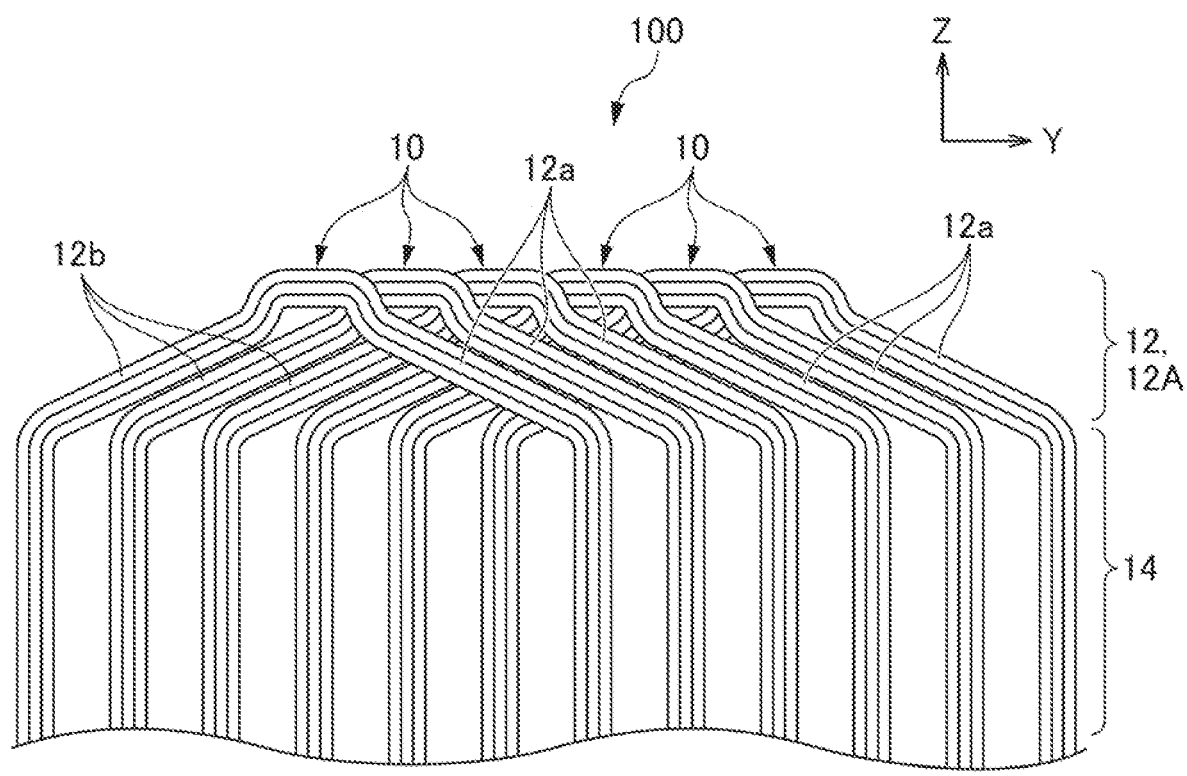
FIG. 7 is a front view illustrating, in an enlarged manner, a part of a group of conductors in which the plurality of coil wires (conductors) illustrated in FIG. 5 are arranged in parallel to each other.
Figure 8:
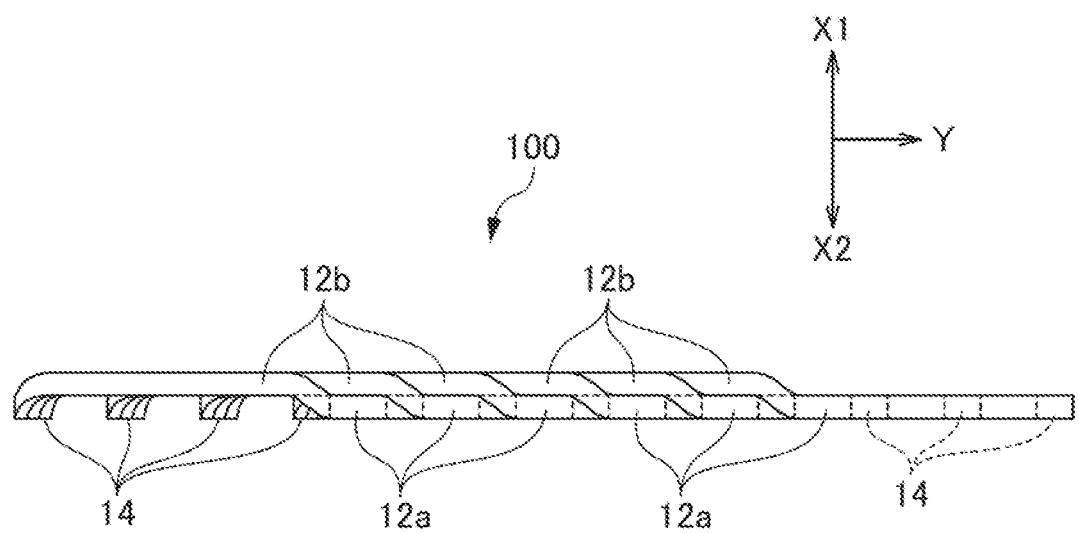
FIG. 8 is a view when the group of conductors illustrated in FIG. 7 is seen in the direction along the Z directions.

A plurality of coil wires 10 formed into a substantial U-shape are arranged in parallel to each other, as illustrated in FIGS. 7 and 8, to form the wave winding coil 1. The plurality of coil wires 10 are arranged in parallel to each other to form a group of conductors 100, In the present embodiment, six coil wires 10 belonging to three phases are used. The six coil wires 10 are arranged in parallel to each other while being offset by a predetermined pitch in the Y directions to thereby form the group of conductors 100. The twelve straight parts 14 are arranged in parallel to each other at equal intervals corresponding to slot intervals on the stator core 20. The first inclined part 12a and the second inclined part 12b of each first turning part 12A are offset by the wire width W of the coil wire 10 in the opposite directions along the X directions. Therefore, when the coil wires 10 and 10 adjacent to each other are stacked together such that the first inclined part 12a of one of the first turning parts 12A and 12A adjacent to each other and the second inclined part 12b of another one of the first turning parts 12A and 12A adjacent to each other intersect each other, all the twelve straight parts 14 are therefore disposed within a single plane extending in the Y directions.

Next, a method of forming the wave winding coil 1 from the group of conductors 100 including the six coil wires 10 arranged in parallel to each other will be described. A specific configuration of a conductor forming device 200 for use to form the wave winding coil 1 will be first described with reference to FIGS. 9 and 10.

The conductor forming device 200 includes a loading stand 201 on which the group of conductors 100 is loaded, a first clamp part 202, a second clamp part 203, and a third clamp part 204 that hold the group of conductors 100 to form inclined parts and to perform folding, and a holder 205 that holds and conveys the group of conductors 100.

On an upper surface 201a of the loading stand 201, the group of conductors 100 conveyed by a conveyor (not shown) is laid such that the turning parts 12 (first turning parts 12A) face the first clamp part 202.

Figure 9:
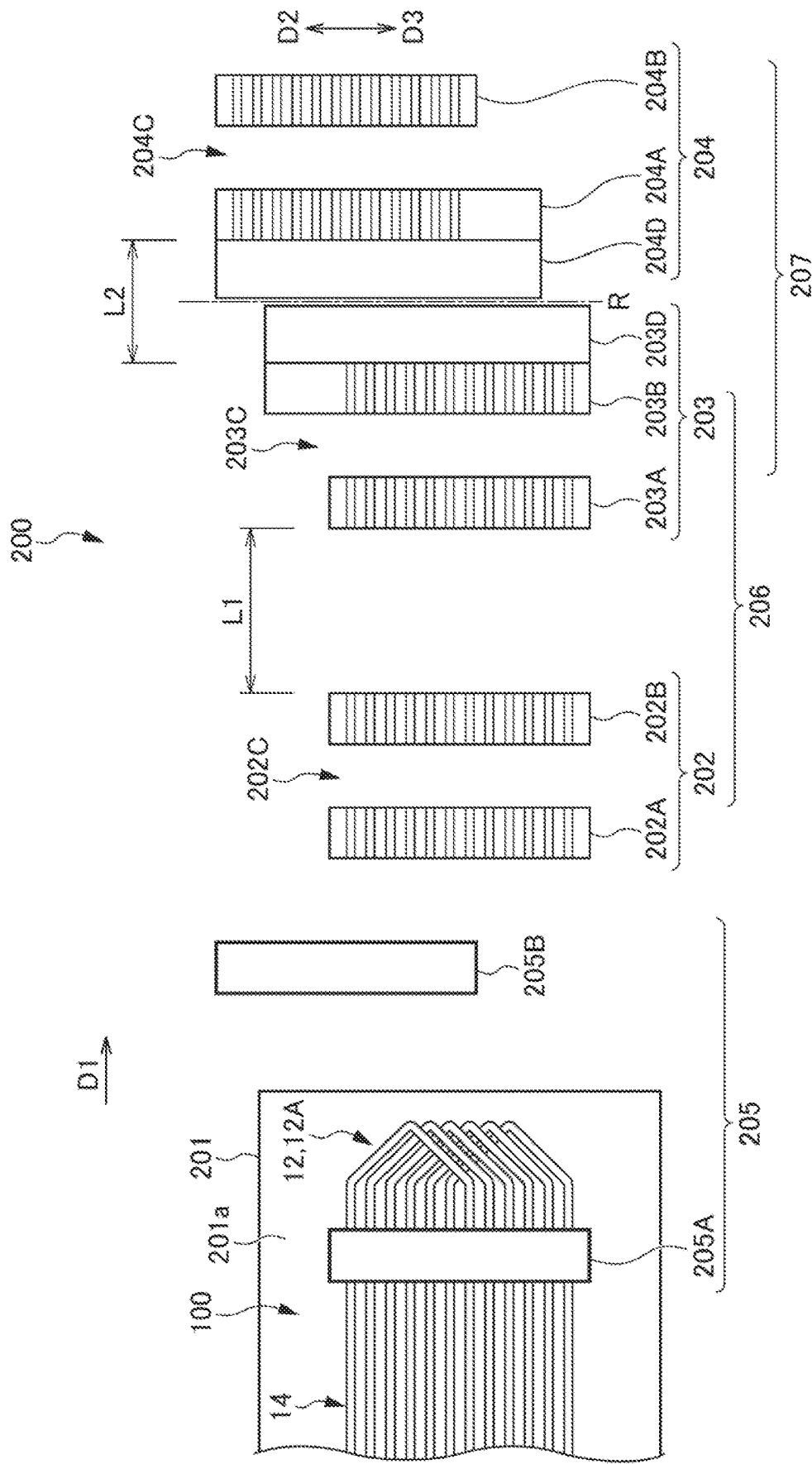
FIG. 9 is a plan view schematically illustrating an outline of a conductor forming device.
Figure 10:
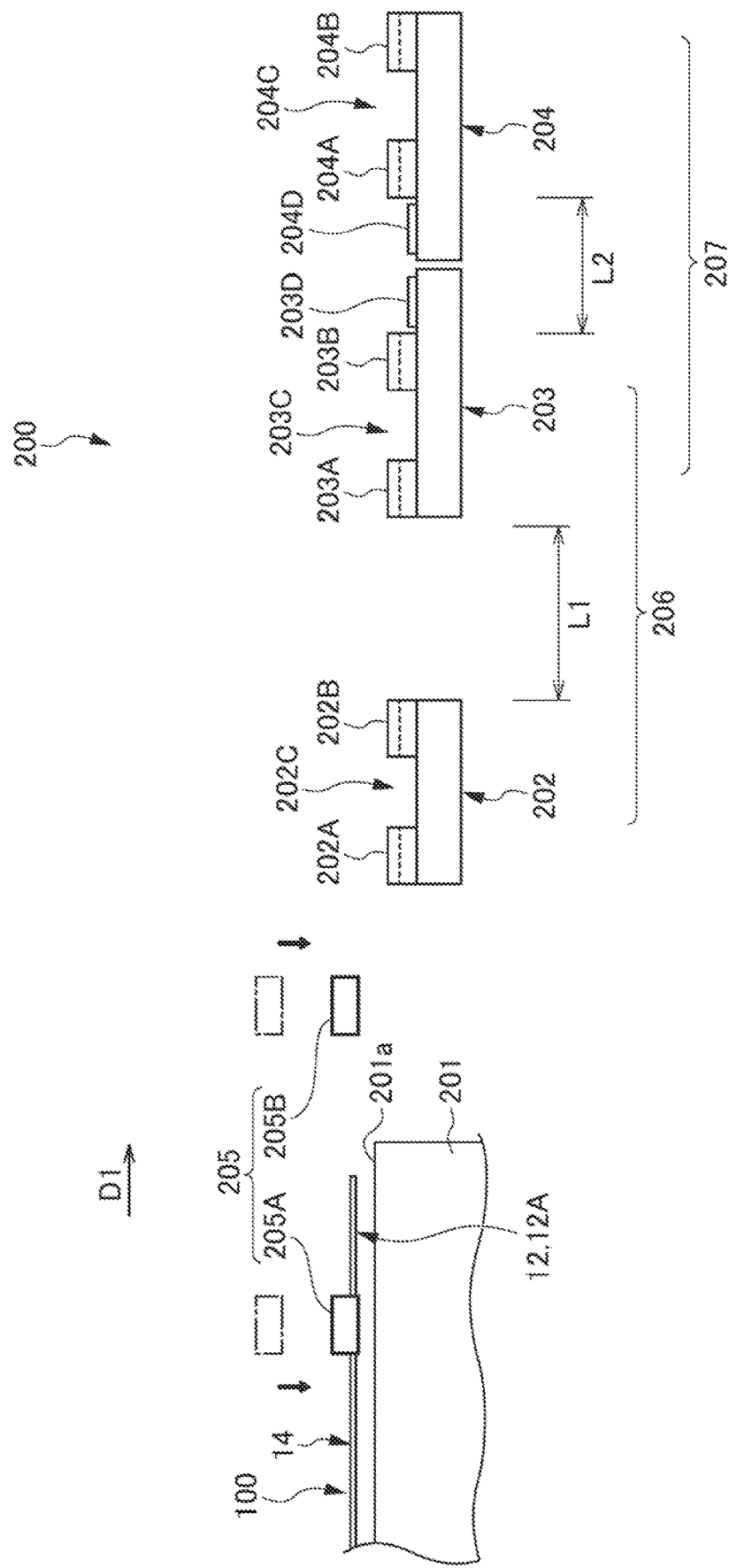
FIG. 10 is a side view schematically illustrating the outline of the conductor forming device.

The first clamp part 202, the second clamp part 203, and the third clamp part 204 are disposed along a conveyance route for the group of conductors 100 to be formed, and are movable upward and downward in the top-bottom direction of the conductor forming device 200 (in vertical direction with respect to the page of FIG. 9, and in the top-bottom direction in FIG. 10). The first clamp part 202, the second clamp part 203, and the third clamp part 204 are configured to be positioned below the upper surface 201a of the loading stand 201 so as not to interrupt the conveyance of the group of conductors 100 when the first, second and third clamp parts 202, 203, and 204 are not clamping the group of conductors 100, and to move upward to hold the group of conductors 100 when the group of conductors 100 is conveyed to reach a position above the first, second, and third clamp parts 202, 203, and 204.

The first clamp part 202 is disposed most proximally to the loading stand 201. The first clamp part 202 includes a pair of clamping members 202A and 202B that collectively hold the straight parts 14 of the coil wires 10 included in the group of conductors 100. The clamping members 202A and 202B each have a width equal to or greater than the width of the group of conductors 100 in the Y directions illustrated in FIG. 7, and are disposed to face the conveyance route for the group of conductors 100 and arranged in parallel to each other at a certain interval in a D1 direction that is a conveyance direction of the group of conductors 100. The certain interval between the clamping members 202A and 202B defines a space 202C where a holding member 205A or 205B of the holder 205, which will be described later, can be accommodated.

The second clamp part 203 is disposed on a side distant from the loading stand 201, relative to the first clamp part 202. The second clamp part 203 includes a pair of clamping members 203A and 203B that collectively hold the straight parts 14 of the coil wires 10 included in the group of conductors 100, similarly to the first clamp part 202. The clamping members 203A and 203B also each have a width equal to or greater than the width of the group of conductors 100, and are disposed to face the conveyance route for the group of conductors 100 and arranged in parallel to each other at a certain interval in the D1 direction that is the conveyance direction of the group of conductors 100. The certain interval between the clamping members 203A and 203B defines a space 203C where the holding member 205A or 205B of the holder 205, which will be described later, can be accommodated.

The third clamp part 204 is disposed on a side further distant from the loading stand 201, relative to the second clamp part 203. The third clamp part 204 includes a pair of clamping members 204A and 204B that collectively hold the straight parts 14 of the coil wires 10 included in the group of conductors 100, similarly to the first clamp part 202 and the second clamp part 203. The clamping members 204A and 204B also each have a width equal to greater than the width of the group of conductors 100, and are disposed to face the conveyance route for the group of conductors 100 and arranged in parallel to each other at a certain interval in the D1 direction that is the conveyance direction of the group of conductors 100. The certain interval between the clamping members 204A and 204B defines a space 204C where the holding member 205A or 205B of the holder 205, which will be described later, can be accommodated.

The second clamp part 203 and the third clamp part 204 are provided with pressing members 203D and 204D, respectively, which are movable upward and downward in the top-bottom direction. The pressing members 203D and 204D are each formed from a plate-like member for pressing, with its surface, the group of conductors 100. The pressing member 203D of the second clamp part 203 is provided on a side distant from the loading stand 201, and is disposed proximally to and in parallel to the clamping member 203B. The pressing member 204D of the third clamp part 204 is provided on a side proximal to the loading stand 201, and is disposed proximally to and in parallel to the clamping member 204A. FIG. 10 illustrates a state in which the pressing members 203D and 204D are at respective positions after being moved downward. At this time, upper surfaces of the pressing members 203D and 204D are disposed below upper surfaces of the clamping members 203A, 203B, 204A, and 204B so as not to interrupt the conveyance of the group of conductors 100 and a holding operation and a conveyance operation for the group of conductors 100 by each clamping member 203A, 203B, 204A, 204B.

As illustrated in FIGS. 9 and 10, the clamping member 202B, which belongs to the first clamp part 202 and is disposed on a side distant from the loading stand 201, is separated by a distance L1 from the clamping member 203A, which belongs to the second clamp part 203 and is disposed on a side proximal to the loading stand 201. The clamping member 203B, which belongs to the second clamp part 203 and is disposed on a side distal from the loading stand 201, is separated by a distance 12 from the clamping member 204A, which belongs to the third clamp part 204 and is disposed on a side proximal to the loading stand 201. The distance L2 is Shorter than the distance L1.

The third clamp part 204 is disposed to be offset, with respect to the first clamp part 202 and the second clamp part 203, in one direction (a D2 direction in FIG. 9) of width directions of the conductor forming device 200 (D2-D3 directions in FIG. 9). The D2-D3 directions are directions orthogonal to the D1 direction that is the conveyance direction of the group of conductors 100. An amount of offset of the third clamp part 204 in the D2 direction with respect to the second clamp part 203 corresponds to one-half of the width of the group of conductors 100, i.e., a pitch for the six straight parts 14 of the coil wires 10.

The second clamp part 203 and the third clamp part 204 are movable integrally with each other by means of a movement mechanism (nor shown) in the width directions of the conductor forming device 200. In contrast, the first clamp part 202 is immovable. Therefore, when the second clamp part 203 moves relative to the first clamp part 202 in one of the width directions of the conductor forming device 200 in a state in which at least the first clamp part 202 and the second clamp part 203 hold the group of conductors 100, the straight parts 14 of the group of conductors 100 disposed between the first clamp part 202 and the second clamp part 203 are obliquely bent to form inclined parts 15 illustrated in FIG. 20. Accordingly, the first clamp part 202 and at least the second clamp part 203 constitute an inclined part forming mechanism 206 in the conductor forming device 200.

Figure 25:
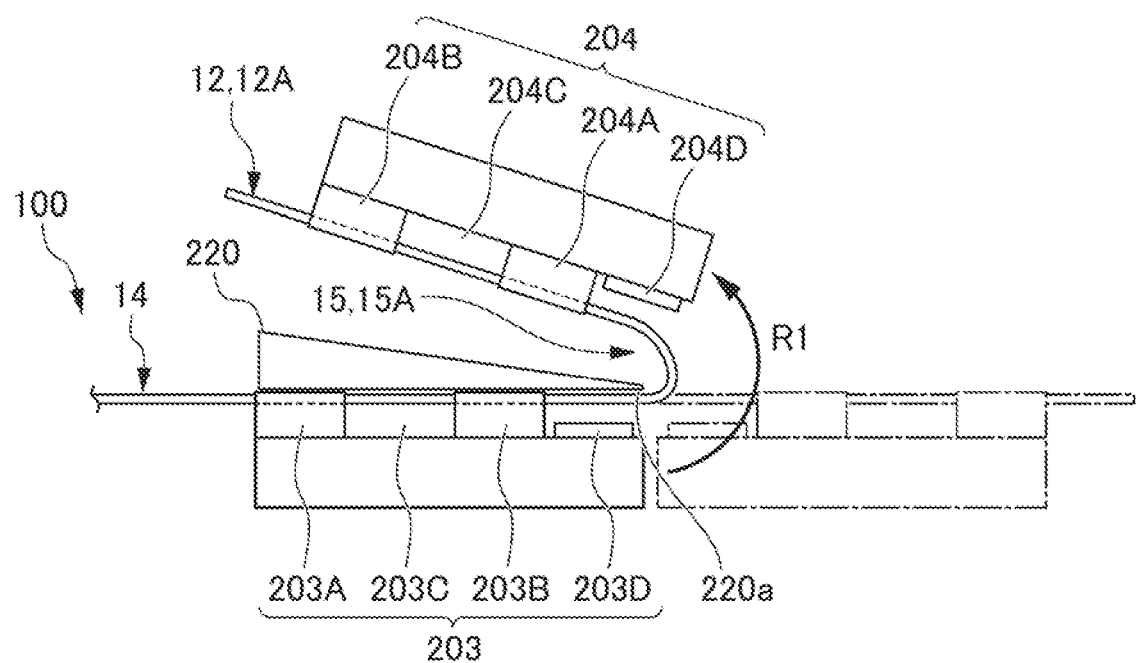
FIG. 25 is a side view illustrating an operation of the clamp parts when the inclined parts formed on the group of conductors are being folded.

The third clamp part 204 is configured to rotationally move by means of a rotational movement mechanism (not shown). As illustrated in FIG. 25, the third clamp part 204 can be placed over the second clamp part 203 by way of folding along a folding line R (see FIG. 9) extending in the width directions between the second clamp part 203 and the third clamp part 204. With the rotation movement of the third clamp part 204, the clamping member 204B, the clamping member 204A, the space 204C, and the pressing member 204D are placed over the clamping member 203A, the clamping member 203B, the space 203C, and the pressing member 203D, respectively, Thus, the conductor 100 held by the second clamp part 203 and the third clamp part 204 is folded along the folding line R in thickness directions (the X1-X2 directions in FIG. 8). Accordingly, the second clamp part 203 and the third clamp part 204 constitute a folding mechanism 207 in the conductor forming device 200.

As illustrated in FIG. 10, the holder 205 is disposed above the upper surface 201a of the loading stand 201, and is configured to move upward and downward with respect to the group of conductors 100 disposed below the holder 205, by means of an ascend/descend mechanism (not shown). The holder 205 holds the group of conductors 100 including the plurality of coil wires 10 having the straight parts 14 such that the plurality of straight parts 14 are arranged in parallel to each other. The holder 205 includes the pair of holding members 205A and 205B each having a width equal to or greater than the width of the group of conductors 100. The pair of holding members 205A and 205B have the same structure. The holding members 205A and 205B are disposed to be separated from each other by a certain distance in the D1 direction, and the holding member 205B is disposed to be offset with respect to the holding member 205A in the D2 direction.

The holder 205 according to the present embodiment is provided separately from the second clamp part 203 and the third clamp part 204 constituting the folding mechanism 207. This configuration makes it possible to constantly maintain a folding position in the folding mechanism 207 unchanged, which enables a suitable positional accuracy to be achieved for the folding position.

The holder 205 is movable relative to the first clamp part 202, the second clamp part 203, and the third clamp part 204 in the D1 direction. In the present embodiment, the holder 205 is movable in the D1 direction. Therefore, the holder 205 conveys the group of conductors 100 held thereon along the conveyance route in the D1 direction, and changes a relative position with respect to the first clamp part 202, the second clamp part 203, and the third clamp part 204.

In an initial state illustrated in FIG. 9, the interval between the pair of holding members 205A and 205B in the D1 direction is slightly narrower than the interval between the space 202C of the first clamp part 202 and the space 203C of the second clamp part 203, and is equal to the interval between the space 203C of the second clamp part 203 and the space 204C of the third clamp part 204. An amount of offset of the holding member 205B with respect to the holding member 205A in the D2 direction is equal to the amount of offset of the third clamp part 204 with respect to the second clamp part 203 in the D2 direction.

Specific structures, for holding the group of conductors 100, of the clamping members 202A, 202B, 203A, 203B, 204A, and 204B and the holding members 205A and 205B may be identical to each other, among the clamping members 202A, 202B, 203A, 203B, 204A, and 204B and the holding members 205A and 205B.

Figure 11:
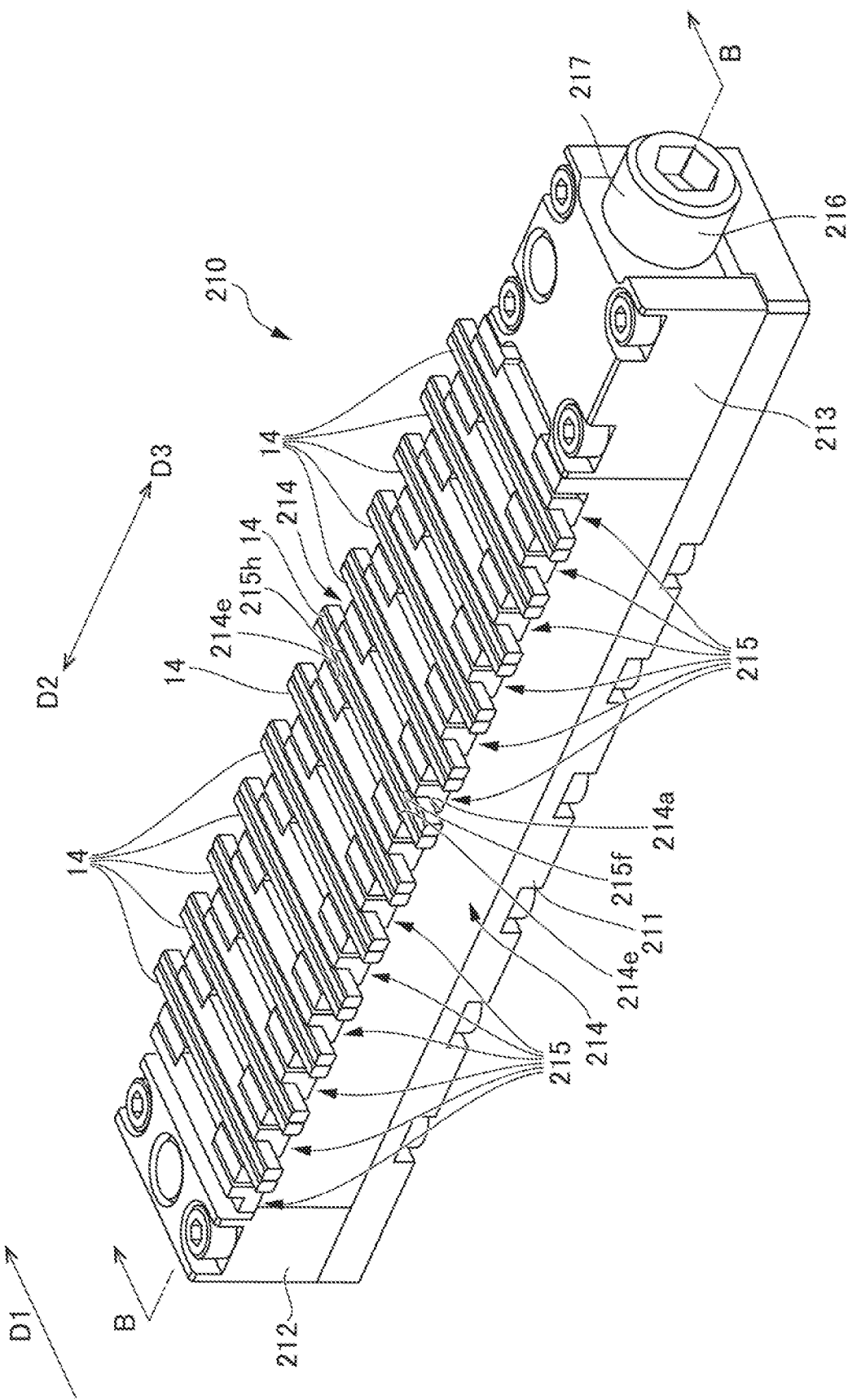
FIG. 11 is a perspective view illustrating a holding device.

As illustrated in FIG. 11, a structure for holding the group of conductors 100 can be constituted by, for example, a holding device 210 serving as a holder that is openable and closable in the width directions of the group of conductors 100 (the Y directions in FIG. 7). The holding device 210 described below is an example of the holder 205, the first clamp part 202, the second clamp part 203, and the third clamp part 204, and holds, with a pair of fixed blocks 214 and a plurality of movable blocks 215, the plurality of straight parts 14 in a group of straight parts as the straight parts 14 of the plurality of coil wires 10. As an example of the holding device 210, a description will be given to a configuration in which the coil wires 10 are held in a case where the number of unit wires 10a of the coil wire 10 is, for example, two. The number of unit wires 10a of the coil wire 10 may be, for example, three or more.

Figure 12:
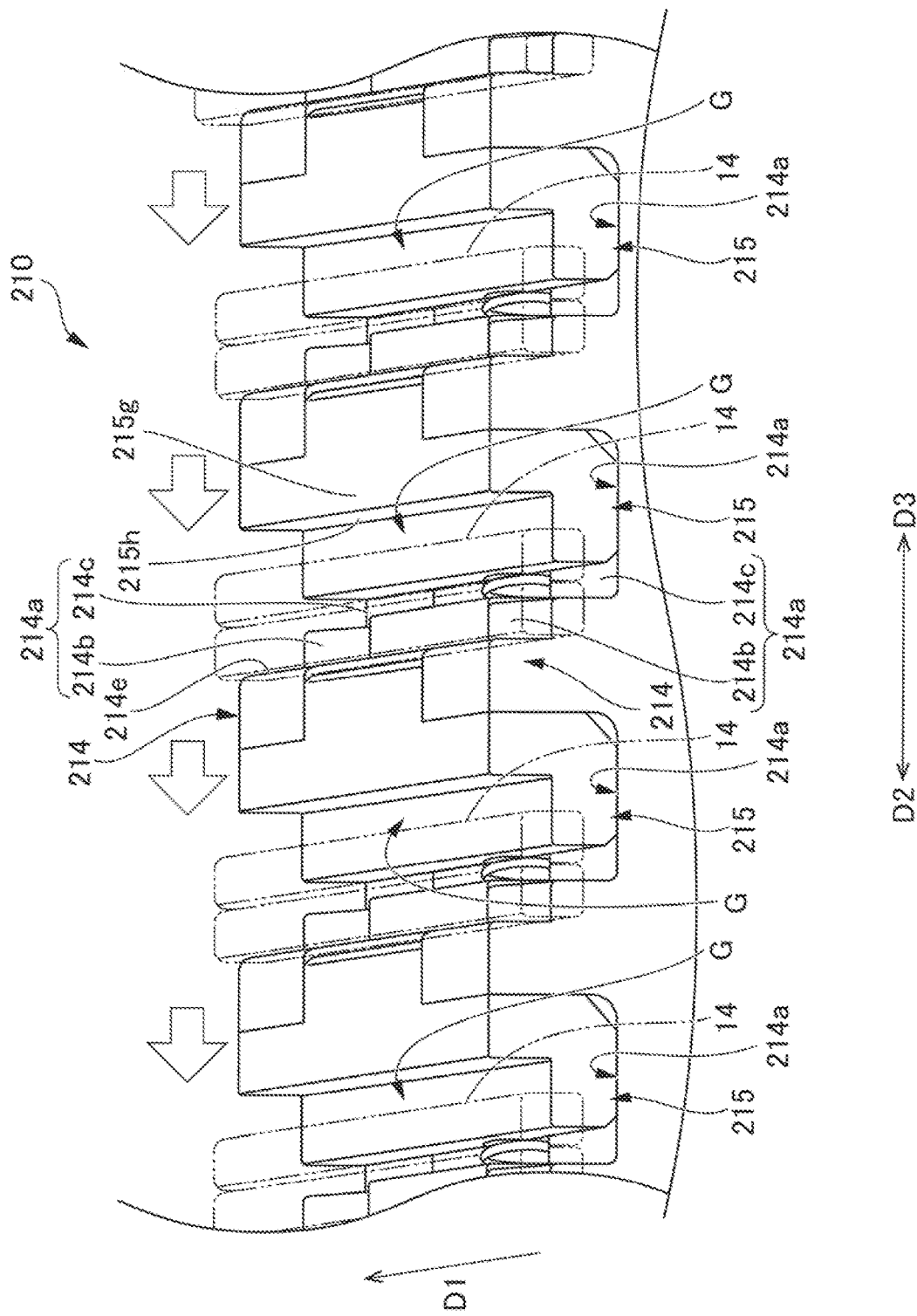
FIG. 12 is a perspective view illustrating a state where the holding device does not pinch a plurality of straight parts.
Figure 13:
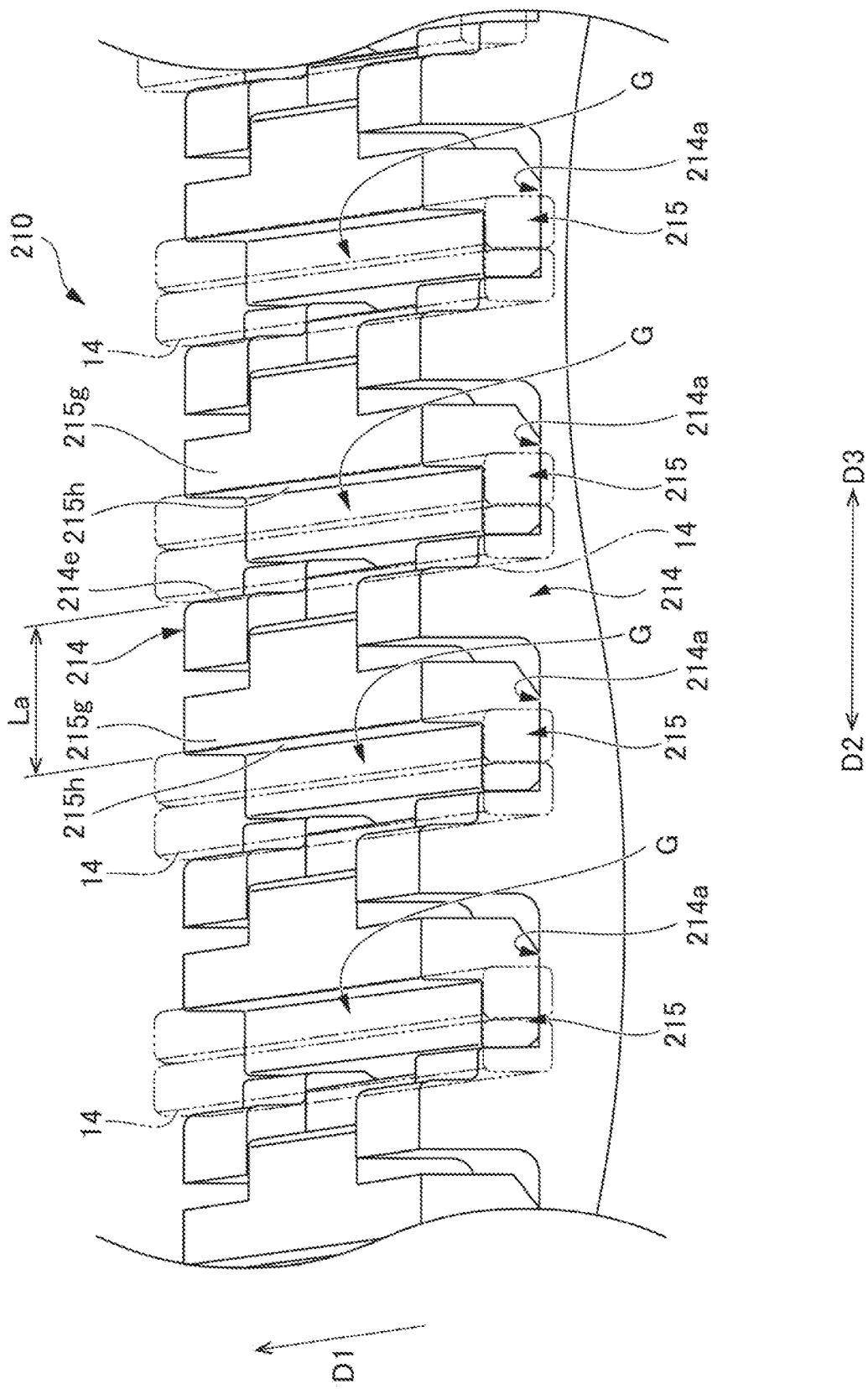
FIG. 13 is a perspective view illustrating a state where the holding device pinches the plurality of straight parts.

As illustrated in FIGS. 12 and 13, the holding device 210 holds the plurality of straight parts 14 included in the group of straight parts of the plurality of coil wires 10 in such a manner that the plurality of movable blocks 215 move in grooves 214a on the pair of fixed blocks 214.

Figure 14:
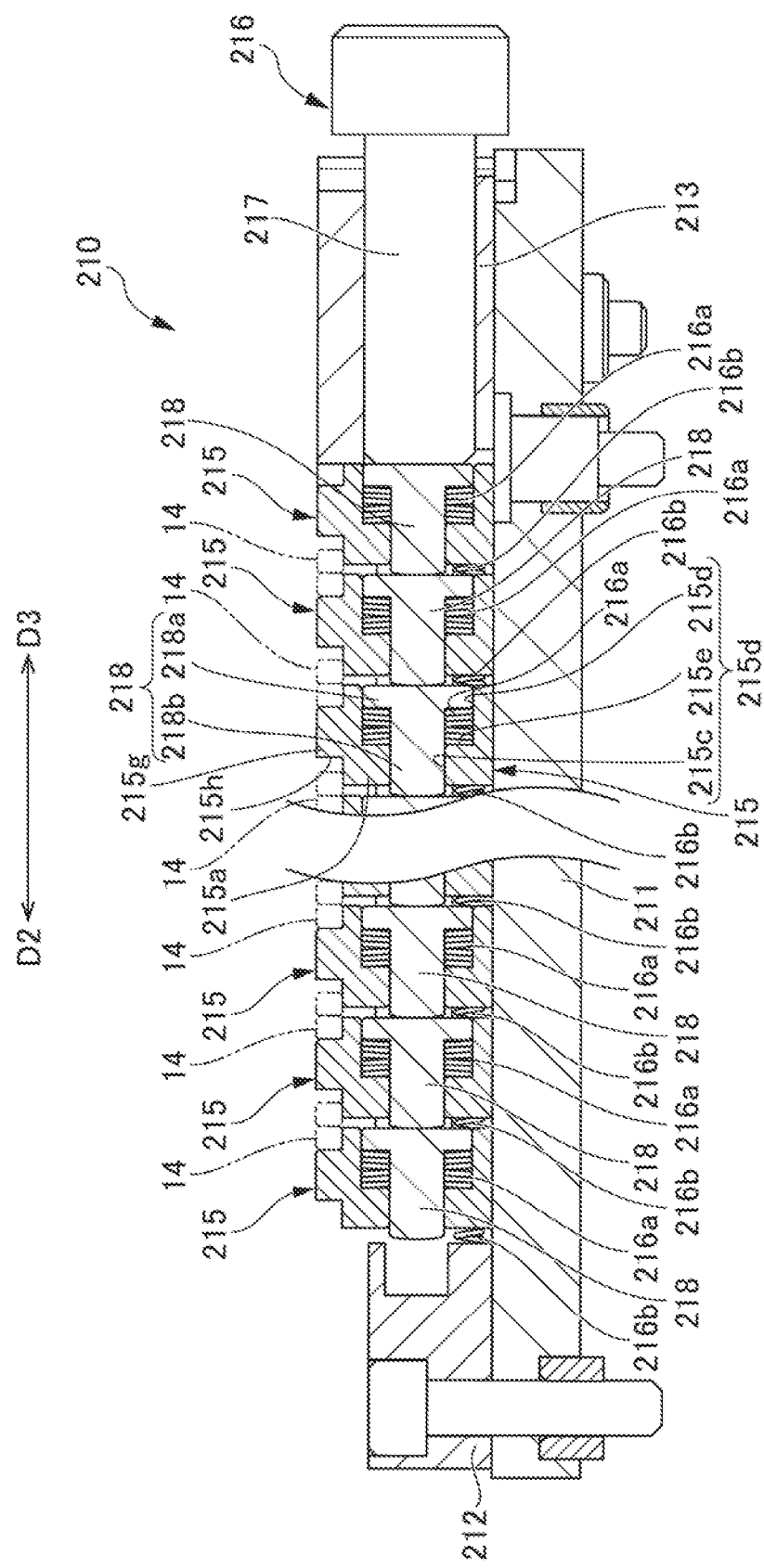
FIG. 14 is a diagram illustrating a state where movable blocks of the holding device are disposed at positions where the movable blocks do not press the plurality of straight parts in a cross-sectional view taken along line B-B in FIG. 11.
Figure 15:
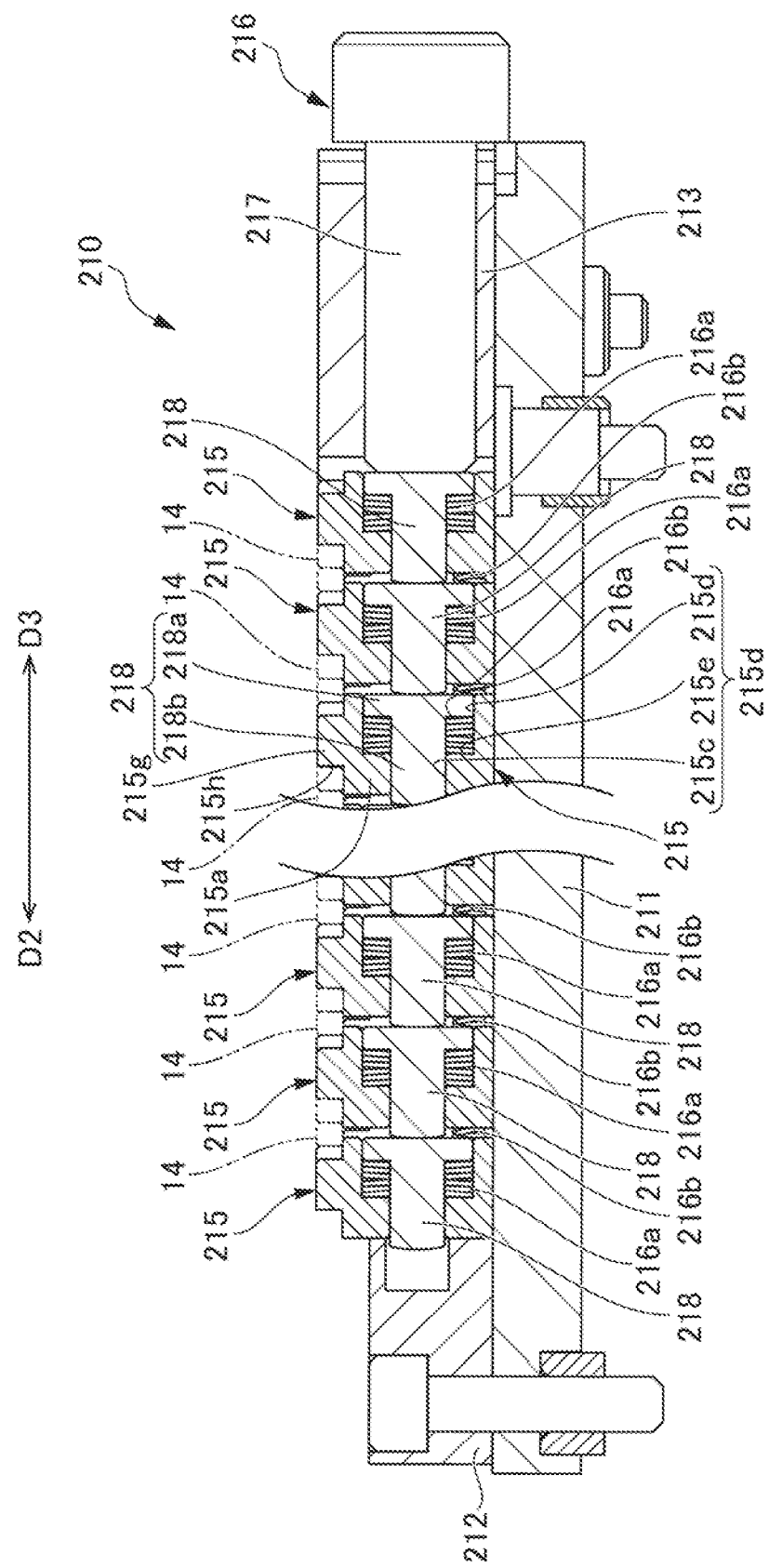
FIG. 15 is a diagram illustrating a state where the movable blocks of the holding device are disposed at positions where the movable blocks press the plurality of straight parts in the cross-sectional view taken along line B-B in FIG. 11.

As illustrated in FIGS. 11, 14, and 15, the holding device 210 includes a base part 211, a first end fixing part 212, a second end fixing part 213, the pair of fixed blocks 214, the plurality of movable blocks 215, and a drive mechanism 216 serving as a driver.

The base part 211 serves as a base of the holding device 210, and is formed into a long plate shape extending in the D2-D3 directions along the width directions of the plurality of straight parts 14 included in the group of straight parts of the plurality of coil wires 10. The first end fixing part 212 is fixed to an upper surface of an end of the base part 211 on the D2 direction side. The second end fixing part 213 is fixed to the upper surface of an end of the base part 211 on the D3 direction side.

Figure 16:
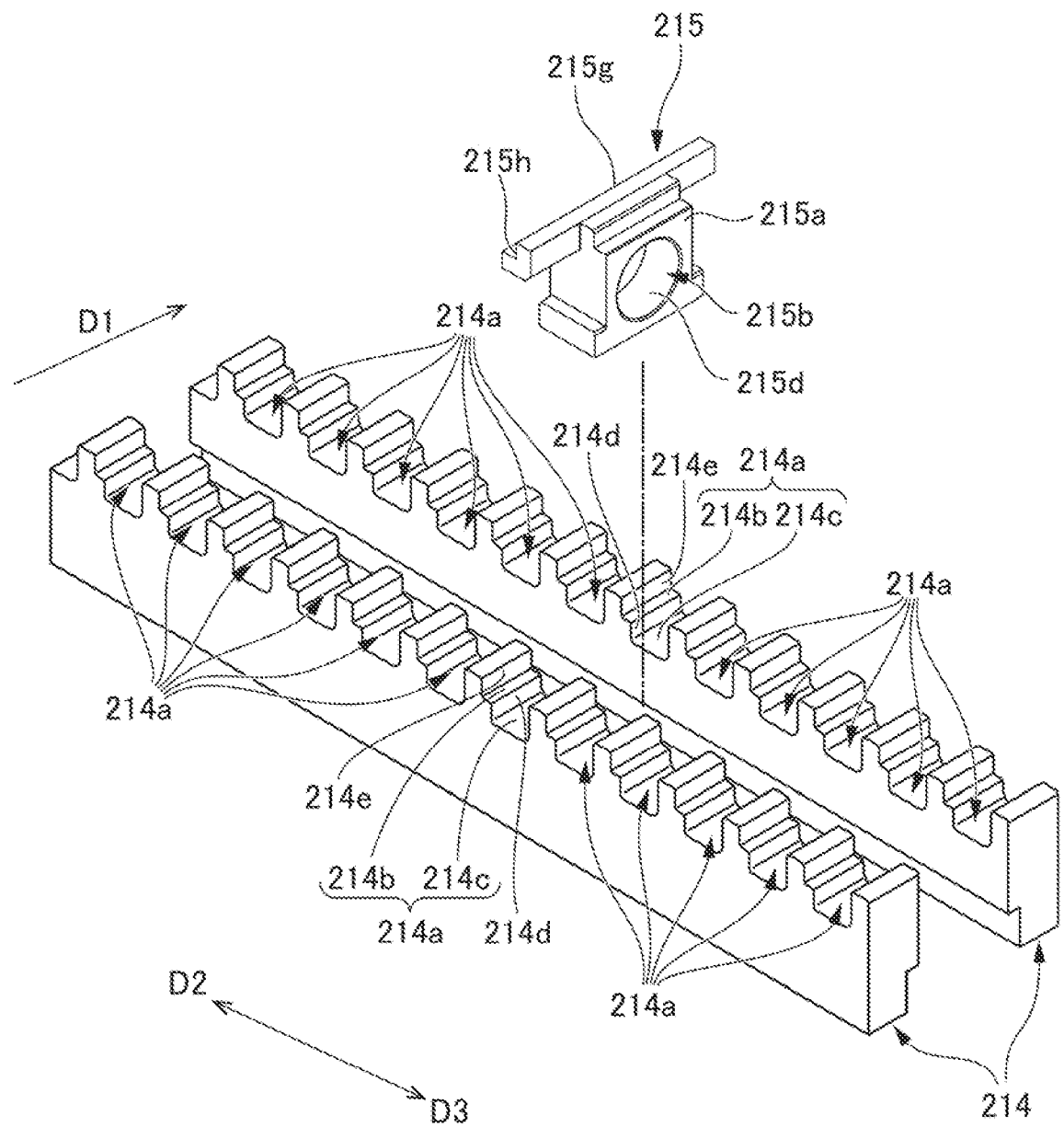
FIG. 16 is a view when an assembled state of the fixed blocks and the movable block is seen from obliquely above.
Figure 17:
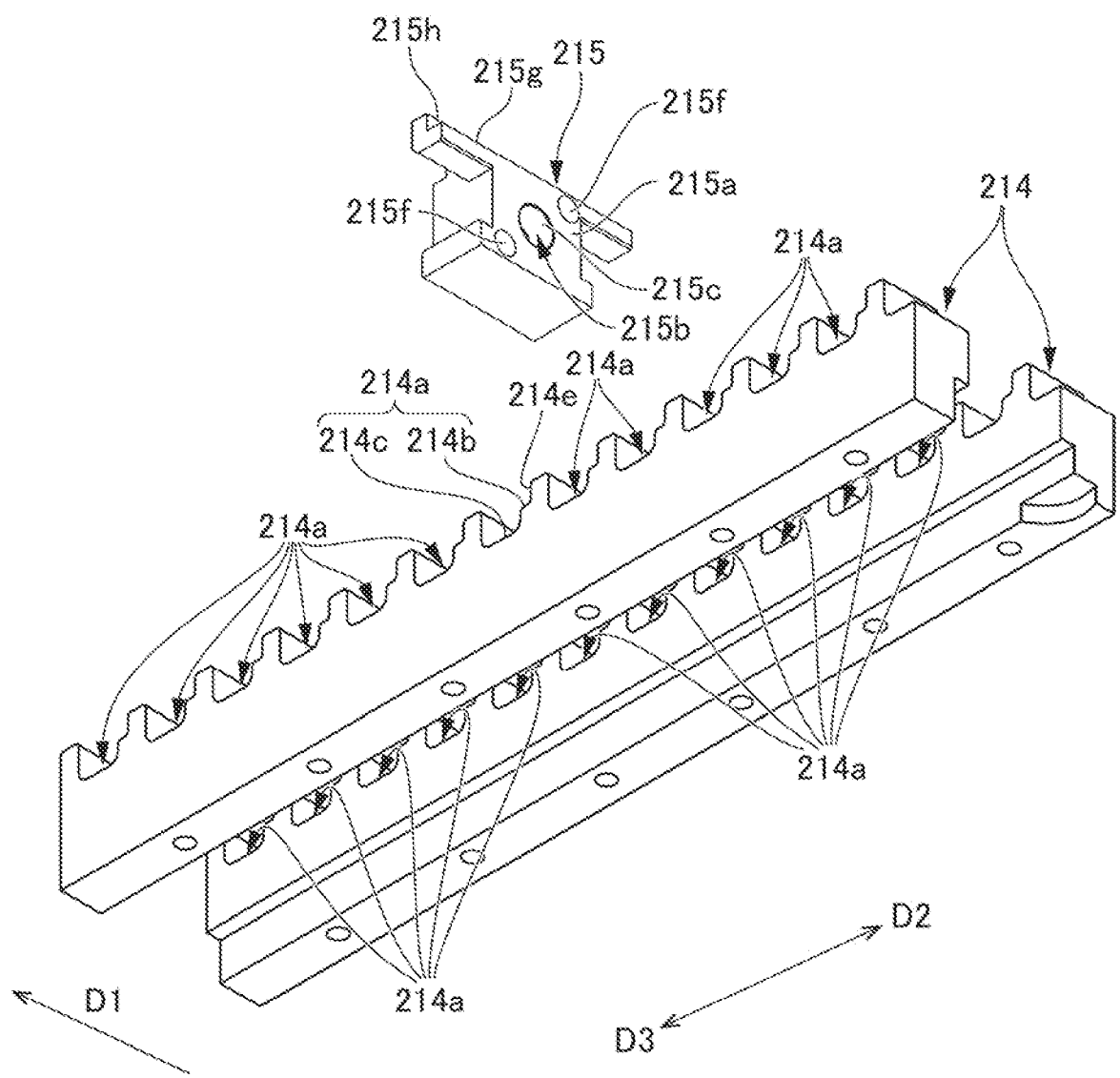
FIG. 17 is a view when an assembled state of the fixed blocks and the movable block is seen from obliquely below.

As illustrated in FIGS. 16 and 17, the pair of fixed blocks 214 extend in the D2-D3 directions in which the base part 211 extends, and are disposed between the first end fixing part 212 and the second end fixing part 213. The pair of fixed blocks 214 are disposed to be separated from each other by a certain distance in the D1 direction that is an extending direction of the straight parts 14. As illustrated in FIGS. 16 and 17, the plurality of grooves 214a are formed on the fixed block 214.

As illustrated in FIGS. 16 and 17, the plurality of grooves 214a are formed to be recessed from an upper part of each of the pair of fixed blocks 214. The plurality of grooves 214a pass through the fixed block 214 in the D1 direction that is the extending direction of the straight parts 14. The plurality of grooves 214a are provided at equal intervals in the D2-D3 directions on the upper part of the fixed block 214.

The groove 214a includes a side sub-groove 214b formed toward the D2 direction and an opposite side sub-groove 214c formed toward the D3 direction side. The opposite side sub-groove 214c is recessed deeper than the side sub-groove 214b. The side sub-groove 214b and the opposite side sub-groove 214c have a step 214d and are continuous with each other in longitudinal directions of the fixed block 214.

As illustrated in FIG. 12, the side sub-groove 214b receives therein the straight part 14 included in the group of straight parts of the plurality of coil wires 10. The side sub-groove 214b has, on its one end side toward the D2 direction, a fixed side contact part 214e formed by a vertical surface that faces the D3 direction. The fixed side contact part 214e is disposed so as to be capable of contacting with one end in the width directions (the D2-D3 directions in FIG. 11) of the straight part 14.

As illustrated in FIGS. 16 and 17, the plurality of movable blocks 215 are disposed to be movable in the respective grooves 214a in the fixed block 214. Each of the plurality of movable blocks 215 is placed astride the corresponding opposite side sub-grooves 214c of the plurality of grooves 214a on the pair of fixed blocks 214. The movable block 215 includes a lower component 215a to be disposed between the pair of fixed blocks 214, and a rod-shaped holding part 215g that is disposed at an upper end of the lower component 215a and extends in the D1 direction that is the extending direction of the straight parts 14.

The lower component 215a is formed into a block shape. As illustrated in FIGS. 16 and 17, a stepped through hole 215b extending in the D2-D3 directions and a pair of spring accommodating recesses 215f are formed in the lower component 215a.

As illustrated in FIGS. 14 to 17, the stepped through hole 215b passed through a center of the lower component 215a in the D2-D3 directions, and has a small-diameter sub-hole 215c formed on the D2 side and a large-diameter sub-hole 215d formed on the D3 side that are formed continuous with each other via a step 215e.

As illustrated in FIG. 17, the pair of spring accommodating recesses 215f are provided diagonally across the stepped through hole 215b in the lower component 215a. The spring accommodating recess 215f is formed in the lower component 215a and has the shape of a circular columnar recess extending from the D2 direction side toward the D3 direction side. A return spring 216b (see FIGS. 14 and 15) is accommodated in the spring accommodating recess 215f.

As illustrated in FIGS. 14 to 17, the rod-shaped holding part 215g has an I-shaped cross section, and extends in a rod shape along the D1 direction. The rod-shaped holding part 215g is placed astride the pair of fixed blocks 214 while having its ends in the D1 direction disposed in the corresponding opposite side sub-grooves 214c of the grooves 214a of the pair of fixed blocks 214. The rod-shaped holding part 215g includes a movable side contact part 215h formed by a vertical surface that faces the D2 direction side. The movable side contact part 215*h* is disposed so as to be capable of contacting with the other end in the width directions (the D2-D3 directions in FIG. 11) of the straight part 14.

The movable side contact part 215*h* of each movable block 215 is disposed to face the D3 side of the corresponding fixed side contact parts 214*e* of the fixed blocks 214. As illustrated in FIGS. 12 and 13, the movable side contact part 215*h* of each movable block 215 and the corresponding fixed side contact parts 214*e* of the fixed blocks 214 defined therebetween a straight part placement groove G in which one of the plurality of straight parts 14 included in the group of straight parts of the plurality of coil wires 10 is to be disposed. When the movable blocks 215 move to in a direction in which the straight parts 14 are pressed, each of straight parts 14 disposed in the straight part placement grooves G is pressed onto and pinched between the movable side contact part 215*h* of the movable block 215 and the corresponding fixed side contact parts 214*e* of the fixed blocks 214.

The drive mechanism 216 is capable of driving the movable blocks 215 independently from each other. As illustrated in FIGS. 14 and 15, the drive mechanism 216 includes a driving member 217, a plurality of movable links 218, a plurality of pressing adjustment springs 216*a* serving as urging parts, and the plurality of return springs 216*b*.

The movable link 218 is disposed to penetrate in the D2-D3 direction inside the stepped through hole 215*b* in the lower component 215*a* of the movable block 215. The movable link 218 includes a large-diameter part 218*a* disposed on the D3 side and a small-diameter part 218*b* disposed on the D2 side. The large-diameter part 218*a* and the small-diameter part 218*b* are continuous with each other in the D2-D3 direction.

The pressing adjustment spring 216*a* is disposed between the step 215*e* of the stepped through hole 215*b* in the movable block 215 and the large-diameter part 218*a* of the movable link 218. The pressing adjustment spring 216*a* is formed by a disc spring, for example. The pressing adjustment spring 216*a* urges the corresponding movable block 215 in a direction opposite to a direction in which the straight part 14 is pressed and pinched between the corresponding movable block 215 and the fixed blocks 214.

The driving member 217 is disposed to penetrate in the D2~D3 direction inside the second end fixing part 213, and is driven in the D2-D3 direction by a cylinder (not shown). The driving member 217 transmits a driving force from the cylinder (not shown) to the plurality of movable links 218. The driving member 217 presses the movable links 218 against urging forces of the pressing adjustment springs 216*a*, thereby driving each movable block 215 against the urging force of each pressing adjustment springs 216*a*.

The return spring 216*b* is disposed in the corresponding spring accommodating recess 215*f* (see FIG. 17) of the movable block 215, as illustrated in FIGS. 14 and 15. The return spring 216*b* urges adjacent ones of the movable blocks 215 in a direction away from each other. Thus, when the driving member 217 moves the movable links 218 to the D3 side from the state of being pressed toward the D2 side, the return springs 216*b* move and return the movable blocks 215 to be separated from each other. This enables the plurality of movable links 218 to be moved by the return springs 216*b* after releasing the holding of the straight parts 14, such that intervals between the plurality of movable links 218 are uniform.

When the driving member 217 does not press the movable links 218 toward the D2 side as illustrated in FIG. 14, a width between the movable side contact part 215*h* of each movable block 215 and the corresponding fixed side contact parts 214*e* of the fixed blocks 214 is wider than the width of the straight part 14 of the coil wire 10 as illustrated in FIG. 12. Therefore, each straight part 14 of the coil wires 10 can be accommodated in the straight part placement groove G between the movable side contact part 215*h* of each movable block 215 and the corresponding fixed side contact parts 214*e* of the fixed blocks 214, or each straight part 14 of the coil wires 10 can be removed from the straight part placement groove G between the movable side contact part 215*h* of each movable block 215 and the corresponding fixed side contact parts 214*e* of the fixed blocks 214.

On the other hand, when the driving member 217 is driven to press the movable links 218 toward the D2 side as illustrated in FIG. 15, the width between the movable side contact part 215*h* of each movable block 215 and the corresponding fixed side contact parts 214*e* of the fixed blocks 214 is slightly narrower than the width of the straight part 14 of the coil wire 10 as illustrated in FIG. 13. Therefore, the straight parts 14 of the coil wires 10 are disposed in the straight part placement grooves G in the state where the driving member 217 does not press the movable links 218 toward the D2 side, and then the driving member 217 is driven in this state, whereby the movable links 218 are pressed and moved toward the D2 side.

In this case, the pressing adjustment spring 216*a* disposed between each movable block 215 and each movable link 218 enables each movable block 215 to absorb the variation in the width of the straight parts 14 of the coil wires 10 and to press each straight part 14 of the coil wire 10 toward the corresponding fixed side contact parts 214*e* of the fixed blocks 214. Thus, even when there is variation in the variation in the width of the plurality of straight parts 14, the holding device 210 can absorb the variation in the width of the plurality of straight parts 14 of the plurality of coil wires 10, thereby holding the straight parts 14 of the coil wires 10 in the respective straight part placement grooves G.

Further, a configuration is achieved in which the movable blocks 215 are disposed in the respective groove 214*a* while maintaining intervals between grooves 214*a* on each fixed block 214 so that the plurality of straight parts 14 included in the group of straight parts of the plurality of coil wires 10 are held while being in contact with and pressed onto the movable side contact parts 215*h* of the movable blocks 215 and the corresponding fixed side contact parts 214*e* of the fixed blocks 214. As illustrated in FIG. 13, this configuration makes it possible to maintain, in respect of adjacent ones of the straight part placement grooves G, a distance La between the movable side contact part 215*h* at the end on the D3 side of the straight part placement groove G disposed toward the D2 side and the movable side contact part 215*h* at the end on the D2 side of the straight part placement groove G disposed toward the D3 side within a predetermined range. Therefore, each of the plurality of straight parts 14 can be held in a state of being in contact with and pressed onto the corresponding movable block 215 and the fixed blocks 214, while maintaining intervals between the plurality of straight parts 14. This enables the coil wires 10 to be firmly fixed between the movable blocks 215 and the fixed blocks 214.

The holding device 210 configured as described above absorbs the variation in the width of the plurality of straight parts 14 included in the group of straight parts of the plurality of coil wires 10, whereby each of the plurality of straight parts 14 can be held in a state of being in contact with and pressed onto the corresponding movable block 215 and the fixed blocks 214, while maintaining intervals between the plurality of straight parts 14. This makes it possible to form a coil wire 10 accurately and to form a high-quality coil wire 10.

Next, a specific forming operation when the conductor forming device 200 performs forming on the group of conductors 100 will be described. As illustrated in FIGS. 9 and 10, the group of conductors 100 including the six coil wires 10 is first loaded on the upper surface 201*a* of the loading stand 201 with the turning parts 12 (the first turning parts 12A) facing toward the first clamp part 202.

When the holder 205 moves toward the group of conductors 100 on the loading stand 201, and the holding member 205A on the side proximal to the loading stand 201 reaches a position above the group of conductors 100, the holder 205 moves downward and the holding member 205A holds each of the straight parts 14 that lie in proximity to the turning parts 12 (the first turning parts 12A) of the group of conductors 100. At this time, the other holding member 205B stays between the loading stand 201 and the first clamp part 202, and does not hold the group of conductors 100. The holder 205 having the group of conductors 100 held thereon linearly moves in the D1 direction along the extending direction of the straight parts 14 to thereby convey, as illustrated in FIG. 18, the group of conductors 100 to a position above the first clamp part 202 and the second clamp part 203 constituting the inclined part forming mechanism 206.

Figure 18:
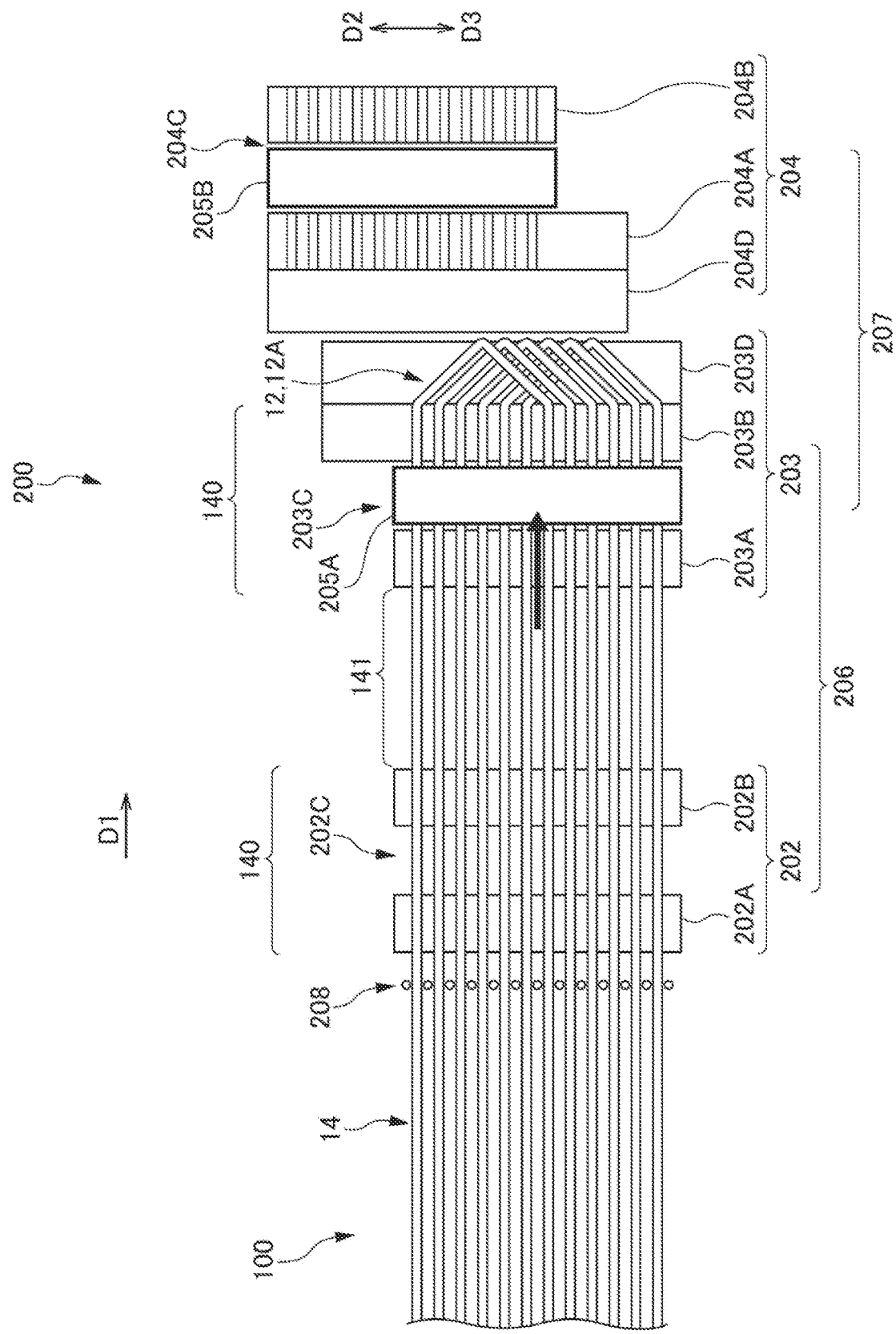
FIG. 18 is a plan view of the conductor forming device, illustrating a situation where the group of conductors is conveyed to a position where inclined parts are to be formed.

Reference numeral 208 in FIG. 18 indicates guide members that are a plurality of pins disposed between the loading stand 201 and the first clamp part 202. After the turning parts 12 (the first turning parts 12A) of the group of conductors 100 have passed above the first clamp part 202, the guide members 208 move upward from below the group of conductors 100, and each enter a space between the straight parts 14 and 14 adjacent to each other. Consequently, the straight parts 14 of the group of conductors 100 being conveyed are prevented from interfering with each other, and the group of conductors 100 being conveyed are thus smoothly guided.

Figure 19:
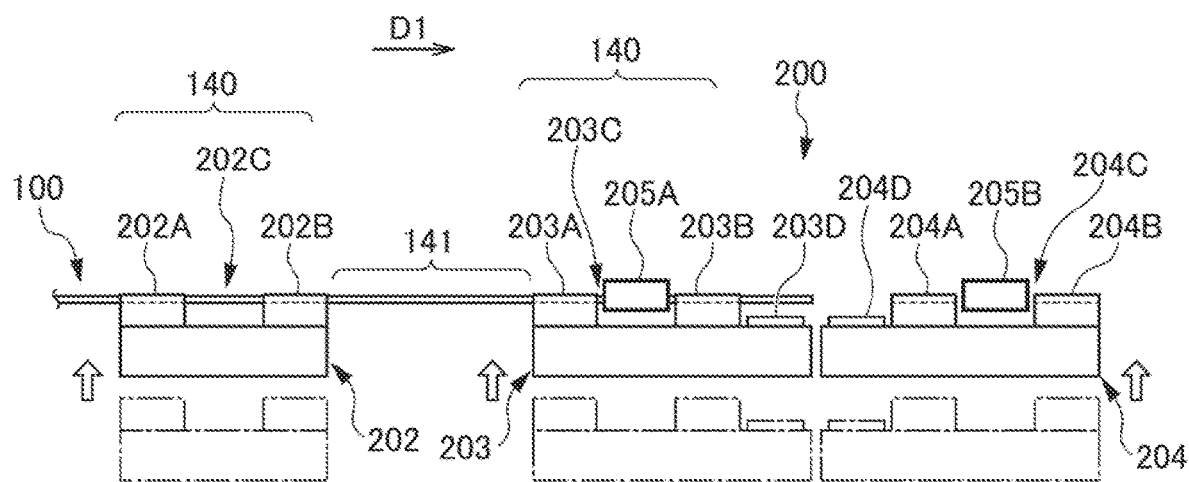
FIG. 19 is a side view of the conductor forming device, illustrating the situation where the group of conductors is conveyed to the position where inclined parts are to be formed.

As illustrated in FIGS. 18 and 19, after the holding member 205A holding the group of conductors 100 moves to a position above the space 203C of the second clamp part 203, the first clamp part 202, the second clamp part 203, and the third clamp part 204 integrally move upward, whereby the holding member 205A is accommodated in the space 203C, When the first clamp part 202 and the second clamp part 203 move upward, the clamping members 202A, 202B, 203A, and 203B are in an open state. There as the first clamp part 202 and the second clamp part 203 move upward, the straight parts 14 of the group of conductors 100 are accommodated in respective grooves 214*a* shown in FIGS. 11 to 13, 16 and 17. After the straight parts 14 are accommodated in the grooves 214*a*, the clamping members 202A, 202B, 203A, and 203B are closed, and hold the group of conductors 100.

As illustrated in FIGS. 18 and 19, holding target parts 140 and 140 of the straight parts 14 that the first clamp part 202 and the second clamp part 203 hold, respectively, are portions corresponding to the in-slot disposition parts 11 of the wave winding coil 1. Therefore, the interval between the pair of clamping members 202A and 202B in the extending direction of the straight parts 14 (a length in the D1 direction of the first clamp part 202 including the space 202C) and the Interval between the pair of clamping members 203A and 203B (a length in the D1 direction of the second clamp part 203 including the space 203C) are each substantially equal to a length of each of the in-slot disposition parts 11 of the wave winding coil 1.

As illustrated in FIGS. 18 and 19, on the straight parts 14 of the group of conductors 100, portions 141 disposed between the first clamp part 202 and the second clamp part 203 are portions of the group of conductors 100 in which the inclined parts 15 are to be formed, and are also portions corresponding to the turning parts 12 of the wave winding coil 1. A length of each of the portions 141, i.e., the distance L1 between the first clamp part 202 and the second clamp part 203 illustrated in FIGS. 9 and 10, is substantially equal to a length of each of the turning parts 12 of the wave winding coil 1 when the turning part 12 is stretched straightforwardly.

After the first clamp part 202 and the second clamp part 203 hold the group of conductors 100, the holder 205 releases the holding of the group of conductors 100 and moves back upwardly to a position above the group of conductors 100. After that, for the preparation for a next holding operation, as illustrated in FIG. 20, the holding member 205A moves to a position above the space 202C of the first clamp part 202.

Figure 20:
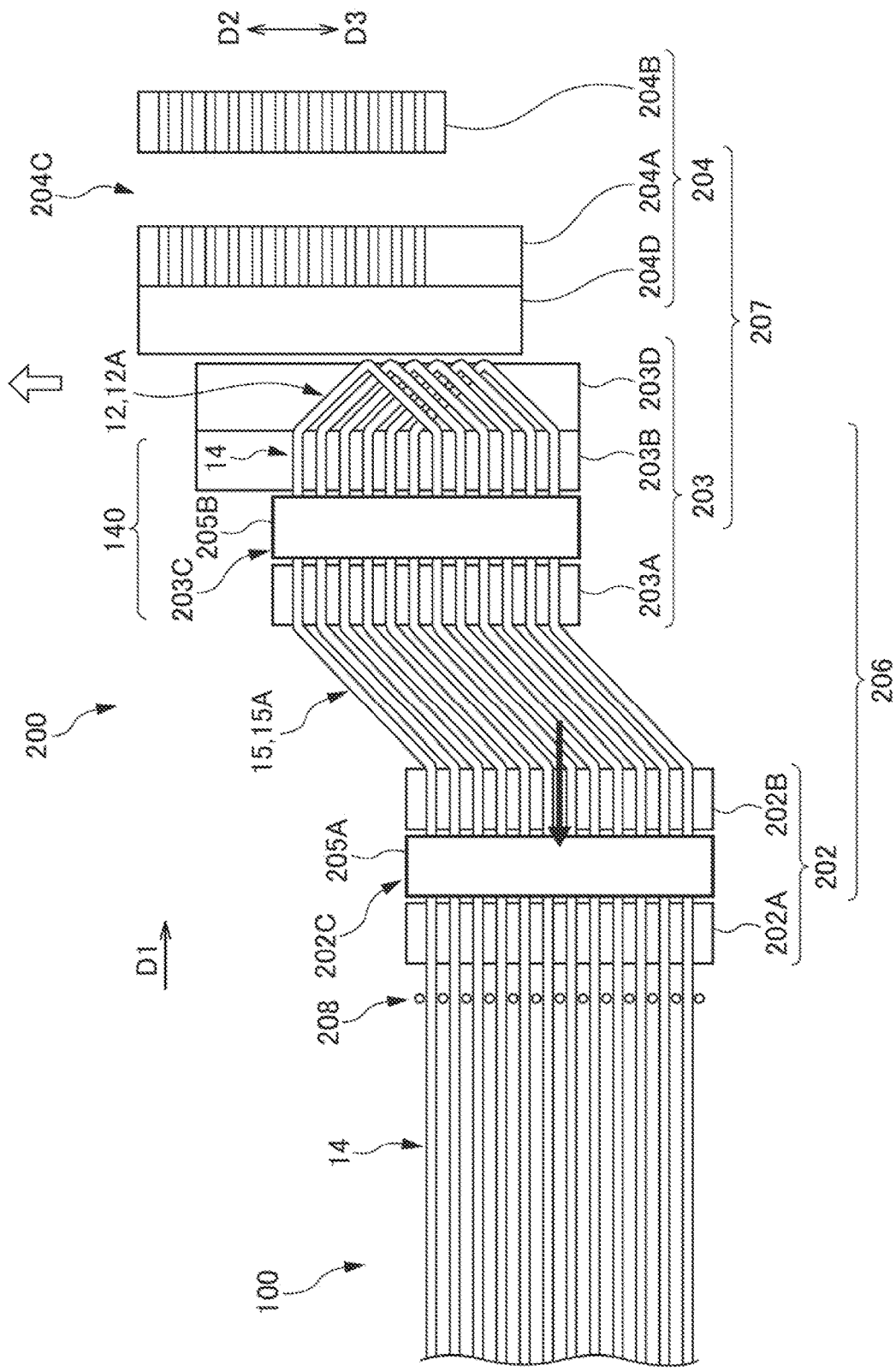
FIG. 20 is a plan view of the conductor forming device, illustrating a situation where inclined parts are being formed on the group of conductors.

Next, the conductor forming device 200 causes, from a state where the first clamp part 202 and the second clamp part 203 are holding the group of conductors 100, the second clamp part 203 and the third clamp part 204 to move relative to the first clamp part 202 in the D2 direction, as illustrated in FIG. 20. Specifically, the first turning parts 12A of the coil wires 10 in the group of conductors 100 and the holding target parts 140 held by the second clamp part 203 are caused, within a plane on which the coil wires 10 included in the group of conductors 100 extend (within a plane of the page of FIG. 20), to be offset in the direction (the D2 direction) intersecting the extending directions of the straight parts 14. Consequently, the portions 141 including the twelve straight parts 14 disposed between the first clamp part 202 and the second clamp part 203 are inclined in the offset direction (the D2 direction), thereby forming respective first inclined parts 15 (inclined parts 15A) on the coil wires 10 included in the group of conductors 100.

An inclination angle of each of the inclined parts 15 relative to the straight parts 14 is, as illustrated in FIG. 5, substantially equal to the inclination angle of each of the first inclined parts 12*a* or the second inclined parts 12*b* of the turning parts 12 formed on the coil wires 10. Forming the inclined parts 15 on the group of conductors 100 causes a side adjacent to the turning parts 12 (the first turning parts 12A) of the group of conductors 100 held by the second clamp part 203 to be disposed and offset, with respect to the straight parts 14 held by the first clamp part 202, in the D2 direction by an amount of offset corresponding to one-half of the width of the group of conductors 100, i.e., a pitch for the six straight parts 14 of the coil wires 10.

Figure 21:
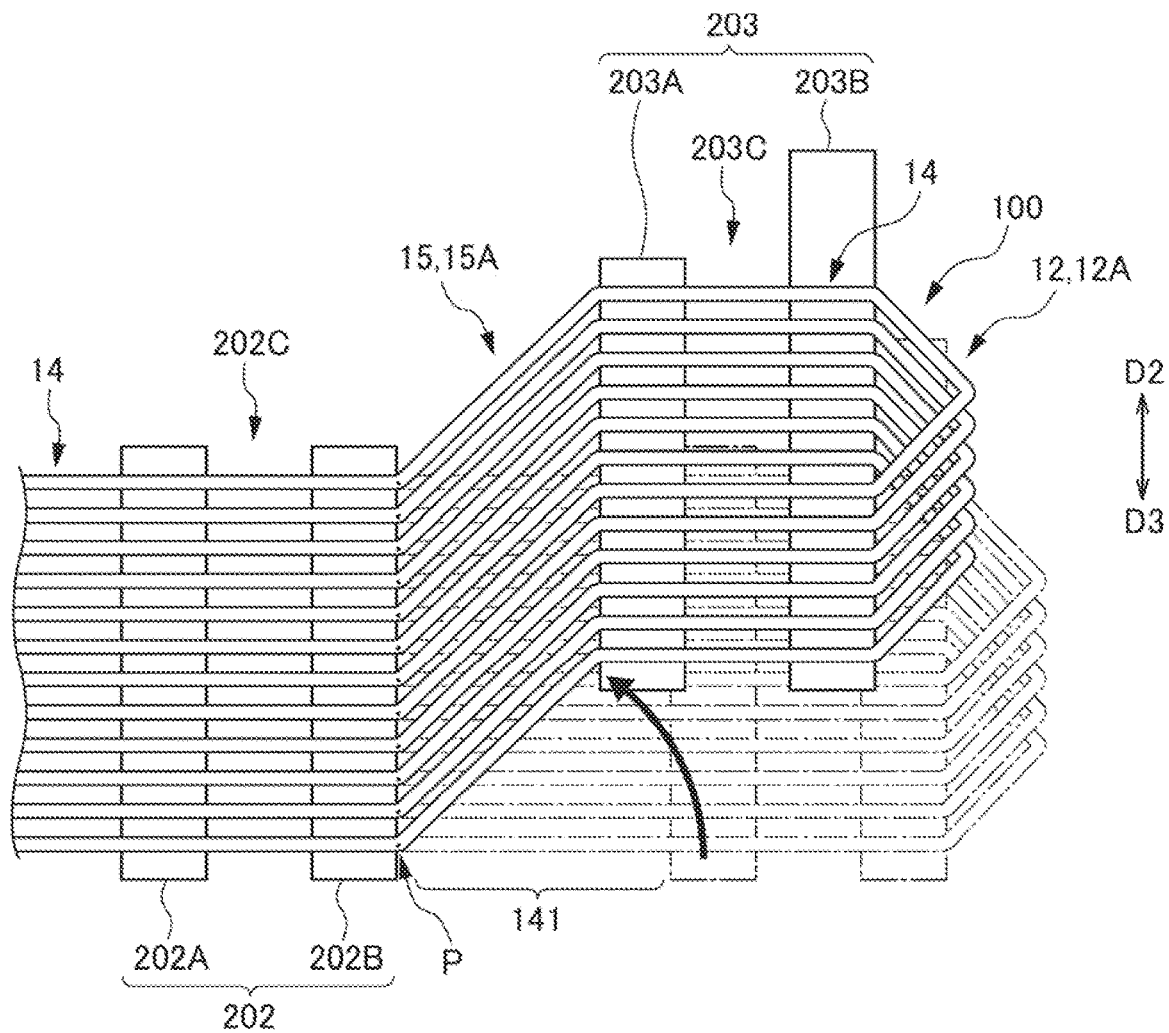
FIG. 21 is a plan view illustrating an operation of the clamp parts when the inclined parts are being formed on the group of conductors.
Figure 22:
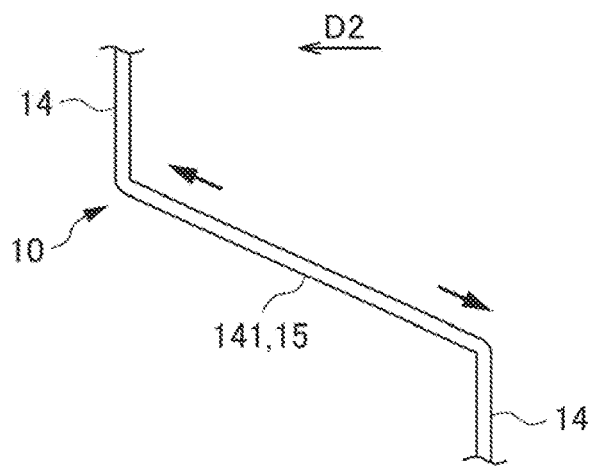
FIG. 22 is a plan view illustrating the inclined part of the conductor after the inclined part is formed.

The conductor forming device 200 according to the present embodiment is configured to not cause, when the inclined parts 15 are to be formed, the side adjacent to the second clamp part 203 to move straightforwardly in the D2 direction, but, as illustrated in FIG. 21, to cause the side adjacent to the second clamp part 203 to move in an arc shape around bending points P serving as boundary points between the inclined parts 15 and the straight parts 14 that are continuous from the inclined parts 15 and are held by the first clamp part 202, at a radius corresponding to a length of each of the inclined parts 15. At this time, the side adjacent to the second clamp part 203 keeps the parallelism to the first clamp part 202, and moves in the arc shape. Consequently, as illustrated in FIG. 22, the inclined part 15 (the portion 141) is pulled in opposite directions and formed, whereby the straightness of the inclined part 15 after being formed becomes satisfactory, thereby improving the forming accuracy for the inclined part 15.

When the second clamp part 203 is offset in the D2 direction to form the inclined parts 15, as illustrated in FIG. 20, the interval between the space 202C of the first clamp part 202 and the space 203C of the second clamp part 203 becomes slightly smaller, and becomes coincident with the interval between the pair of holding members 205A and 205B, Therefore, after formation of the first inclined parts 15 (the inclined parts 15A) of the group of conductors 100, when the holder 205 lying at the position illustrated in FIG. 20 moves downward toward the group of conductors 100, the holding members 205A and 205B are accommodated in the spaces 202C and 203C, respectively, which makes it possible to hold the group of conductors 100.

At this time, since the pair of holding members 205A and 205B hold the group of conductors 100 at two points on the straight parts 14 and 14 disposed on both sides with respect to the inclined parts 15, respectively, the group of conductors 100 is less likely to become loose. Thereafter, as the holder 205 holds the group of conductors 100, the first clamp part 202 and the second clamp part 203 release the holding of the group of conductors 100, move downward and also move in the D3 direction, and return to the positions in the initial state.

Figure 23:
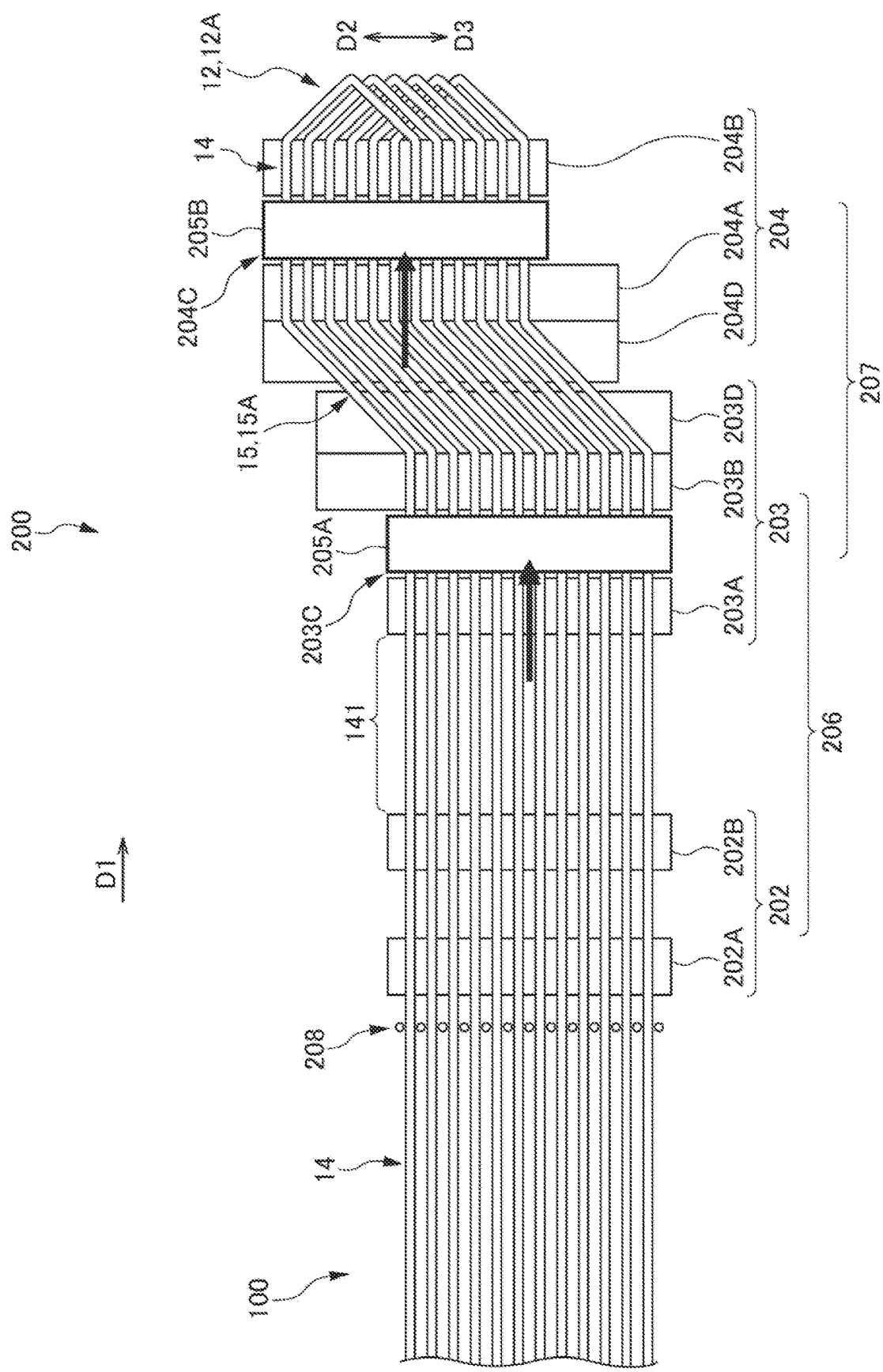
FIG. 23 is a plan view of the conductor forming device, illustrating a situation where the group of conductors formed with the inclined parts is conveyed to a folding position.

Thereafter, the holder 205 holding the group of conductors 100 moves in the D1 direction to convey the group of conductors 100, as illustrated in FIG. 23, until the holding member 205A reaches a position above the space 203C of the second clamp part 203, and the holding member 205B reaches a position above the space 204C of the third clamp part 204. The third clamp part 204 is offset beforehand in the D2 direction with respect to the first clamp part 202 and the second clamp part 203 by one-half of the width of the group of conductors 100, and the holding member 205B of the holder 205 is similarly offset with respect to the holding member 205A. Therefore, as the first clamp part 202, the second clamp part 203, and the third clamp part 204 move upward, the holding members 205A and 205B holding the group of conductors 100 having the first inclined parts 15 (the inclined parts 15A) formed thereon are accommodated in the space 203C of the second clamp part 203 and the space 204C of the third clamp part 204, respectively.

After moving upward, the first clamp part 202, the second clamp part 203, and the third clamp part 204 hold the straight parts 14 of the group of conductors 100, and then the holder 205 releases the holding of the group of conductors 100. At this time, the inclined parts 15 formed on the group of conductors 100 are disposed between the clamping member 203B of the second clamp part 203 and the clamping member 204A of the third clamp part 204. That is, the distance 12 between the clamping member 203B and the clamping member 204A is substantially equal to a distance between the straight parts 14 and 14 that are adjacent to each other with the inclined part 15 interposed therebetween. The portions 141 to be then newly formed as the inclined parts 15 are also disposed between the first clamp part 202 and the second clamp part 203. After retracting upward to a position above the group of conductors 100, the holder 205 moves, for the preparation of next holding, as illustrated in FIG. 24, to the position above the space 202D of the first clamp part 202 and the space 203C of the second clamp part 203.

Figure 24:
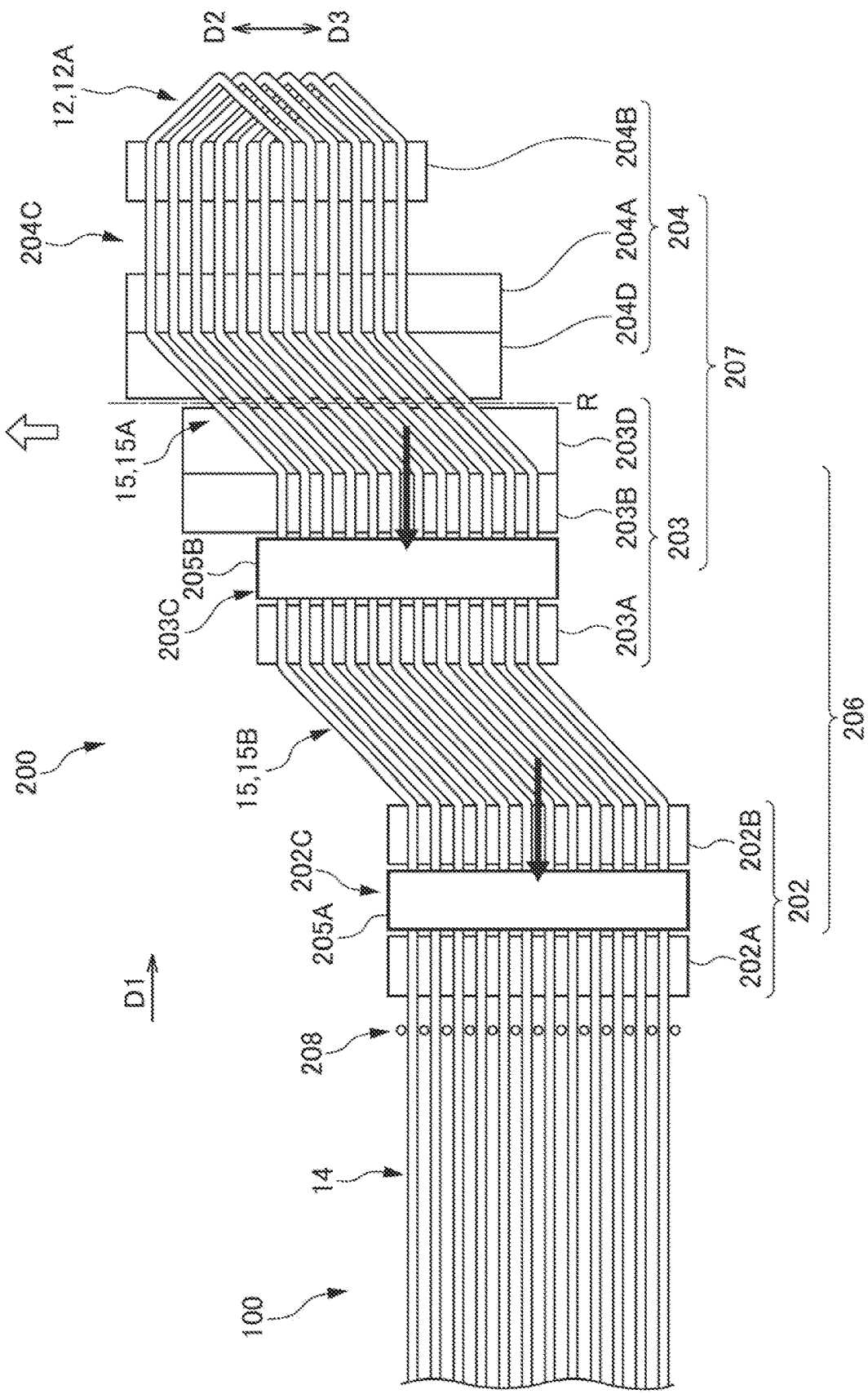
FIG. 24 is a plan view of the conductor forming device, illustrating a situation where next inclined parts are being formed on the group of conductors after the inclined parts are formed.

Thereafter, similar to the case illustrated in FIG. 20, the second clamp part 203 and the third clamp part 204 are caused to move in the D2 direction to form, as illustrated in FIG. 24, each of second inclined parts 15 (the inclined parts 15B) between the first clamp part 202 and the second clamp part 203 (inclined part forming step).

Next, at the center portion of each of the first inclined parts 15A disposed between the second clamp part 203 and the third clamp part 204, i.e., at points along the folding line R disposed between the second clamp part 203 and the third clamp part 204 (see FIGS. 9 and 24), the third clamp part 204 performs a rotation movement to be placed over the second clamp part 203, as illustrated in FIG. 25, to fold the first inclined parts 15A (folding step).

With the rotation movement of the third clamp part 204, the first inclined parts 15A of the group of conductors 100 are folded in one of the thickness directions of the group of conductors 100. The folding line R extends in the D2-D3 directions along the width directions of the group of conductors 100, and intersects with the inclined parts 15A. Therefore, as the inclined parts 15A are folded, the folded parts newly serve as the twelve turning parts 12 (second turning parts 12B) each having a V or inverted V shape (a triangular shape) having the apex parts (the apex parts 12c) at the folding line R. In the present embodiment, the rotation movement of the third clamp part 204 causes the inclined parte 15A to be folded forward along the folding line R in a direction toward the near side on the plane of the page of FIG. 24 (an R1 direction).

Figure 27:
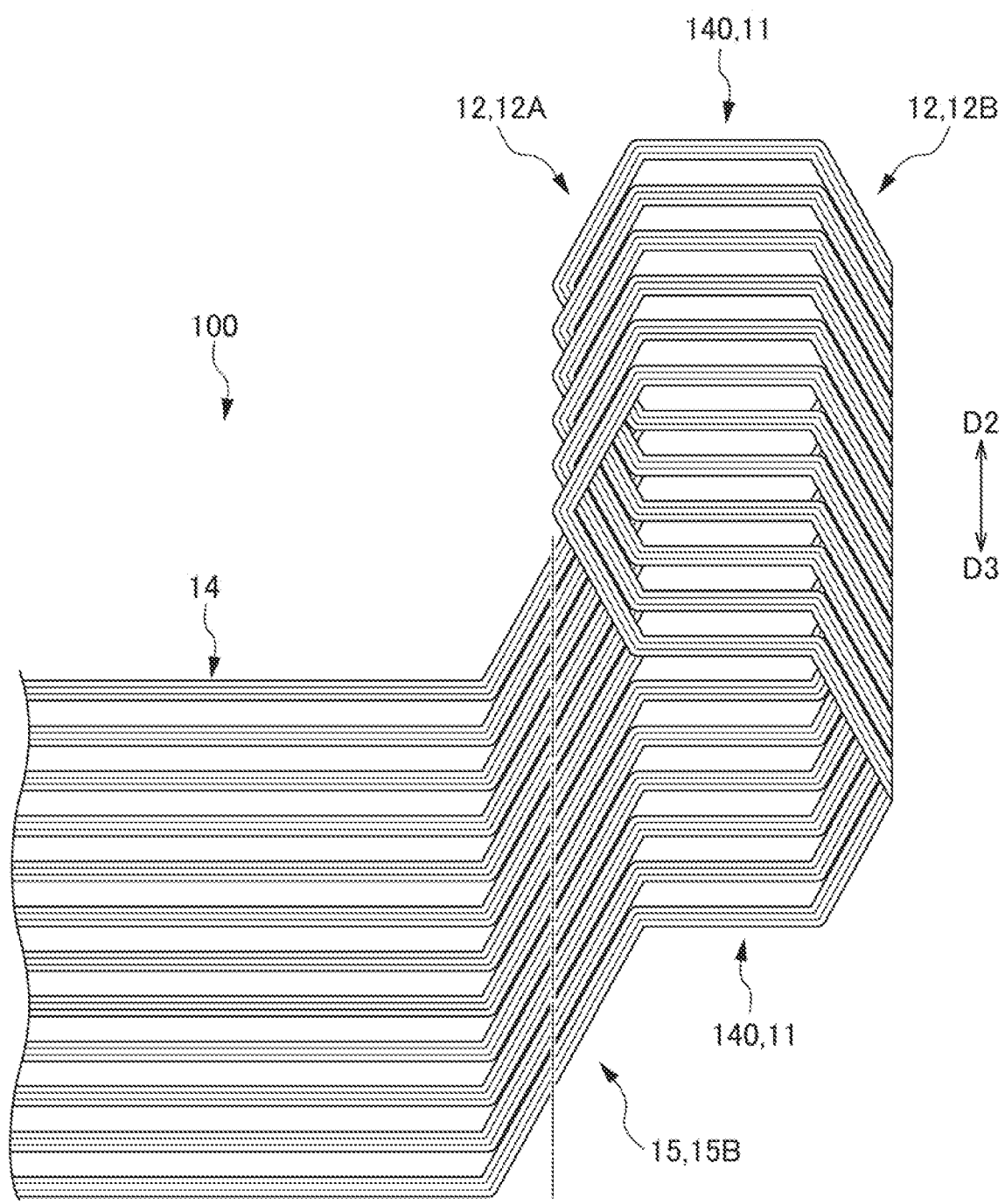
FIG. 27 is a plan view illustrating the group of conductors after the inclined parts are folded.

FIG. 27 illustrates only the group of conductors 100 after the first inclined parts 15A are folded. As illustrated in FIG. 27, after the first inclined parts 15A are folded, the holding target parts 140 and 140 of the straight parts 14 held by the second clamp part 203 and the third clamp part 204 partially overlap with each other to be parallel to each other. Specifically, six out of the twelve holding target parts 140 held by the second clamp part 203 and six out of the twelve holding target parts 140 held by the third clamp part 204 overlap with each other. Consequently, the in-slot disposition parts 11, a total width of which corresponds to a total width of the 18 straight parts 14, are formed.

Figure 26:
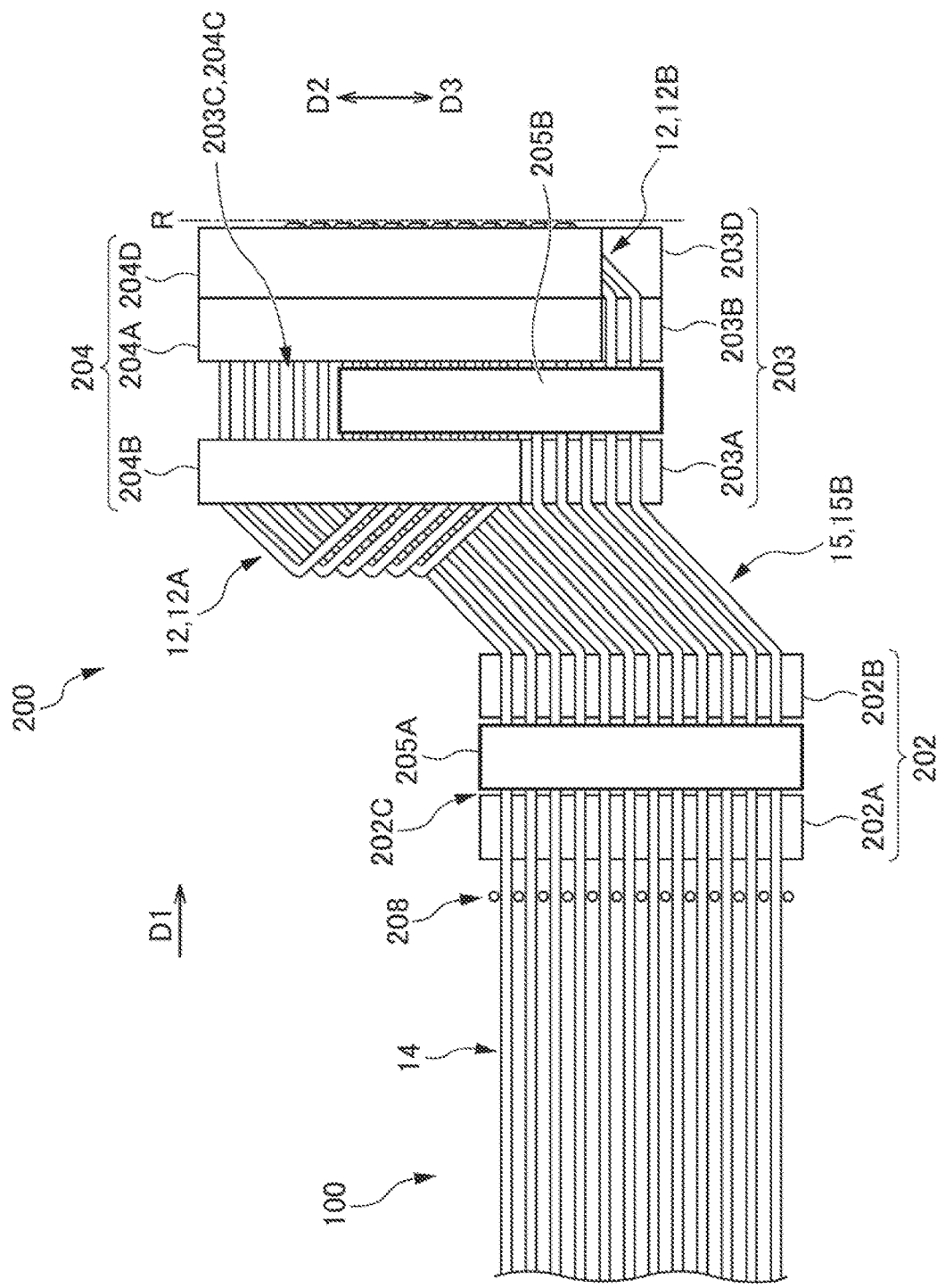
FIG. 26 is a plan view of the conductor forming device, illustrating a situation where inclined parts formed on the group of conductors are folded.

Note that, in the present embodiment, before the folding step is performed for the first time on the group of conductors 100, the two inclined parts 15 (the inclined parts 15A and 15B) are formed. Therefore, as illustrated in FIG. 26, the turning parts 12 (the first turning parts 12A) of the group of conductors 100 after folding are disposed to overlap with the secondly formed inclined parts 15 (the inclined parts 15B). Therefore, the turning parts 12 after folding do not interfere with the straight parts 14 of the group of conductors 100.

As illustrated in FIG. 25, when the inclined parts 15 are to be folded, a folding jig 220 may be inserted between the second clamp part 203 and the third clamp part 204. The folding jig 220 has a triangular shape in cross section, and a peripheral part 220a having an acute apex is inserted along the folding line R on the inclined parts 15. This enables the third clamp part 204 to accurately fold the inclined parts 15 along the folding line R. Before the folding operation is completed, the folding jig 220 is removed from between the second clamp part 203 and the third clamp part 204.

Figure 28:
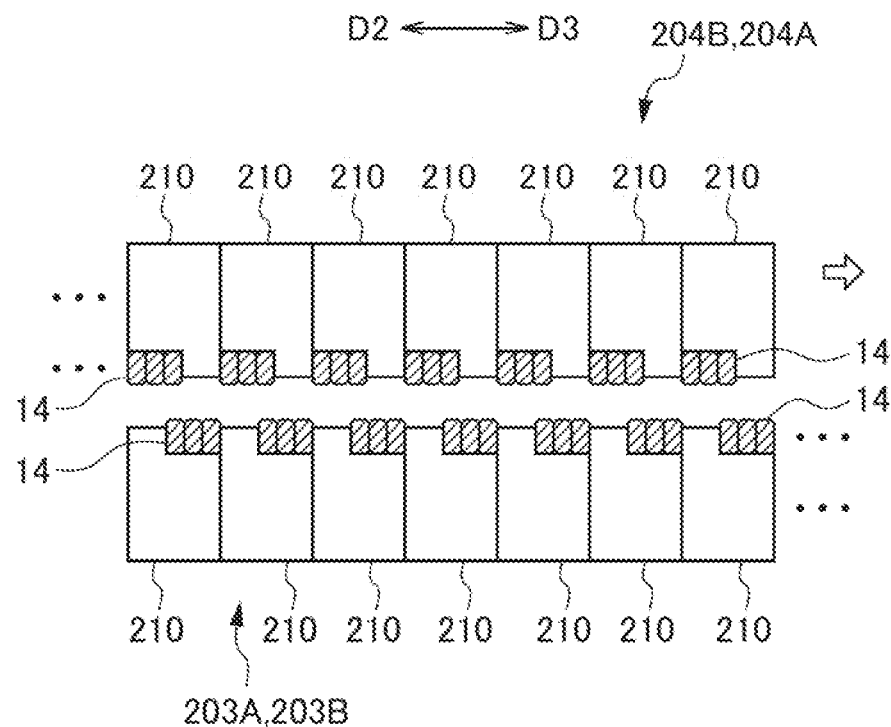
FIG. 28 is a diagram illustrating an operation of the clamp parts after the inclined parts are folded.

As illustrated in FIG. 28, after completion of folding of the inclined parts 15, the third clamp part 204 may also be caused to slightly move, in a state where the group of conductors 100 are held, relative to the second clamp part 203 in arrangement directions of the straight parts 14 and in width directions of the folded parts (the D2-D3 directions). This makes it possible to suppress occurrence of springback that is a phenomenon in which the turning parts 12 after the inclined parts 15 are folded open while returning to the original shape. It is also possible to adjust a pitch between adjacent ones of the six straight parts 14 that has been folded.

Figure 29:
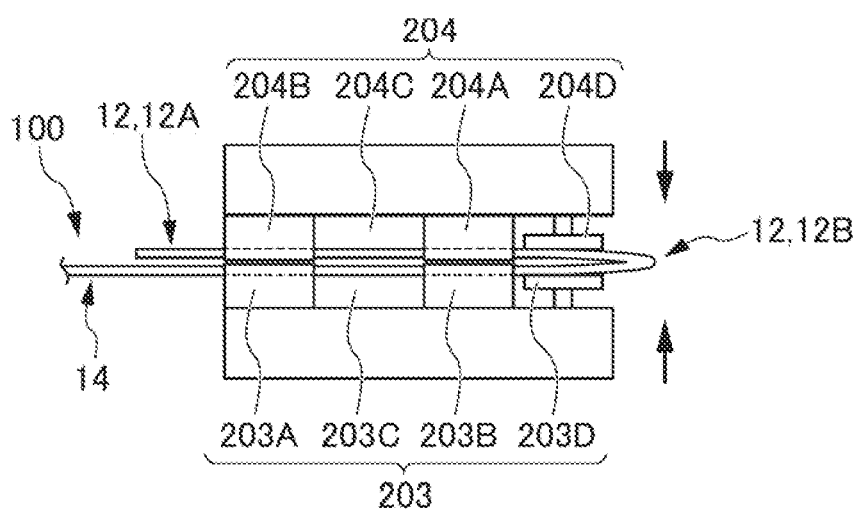
FIG. 29 is a side view illustrating an operation of pressing the folded part with pressing members after the inclined parts are folded.

In the folding step, after the inclined parts 15 are folded, and in a state where the second clamp part 203 and the third clamp part 204 overlap with each other, as illustrated in FIG. 29, the pressing member 203D of the second clamp part 203 moves upward relative to the second clamp part 203, and the pressing member 204D of the third clamp part 204 also moves upward relative to the third clamp part 204, and the turning parts 12 that are the folded parts of the group of conductors 100 are thus pinched between the pressing members 203D and 204D and pressed in the thickness directions. This makes it possible to suppress expansion of the turning parts 12 in the thickness directions due to the springback and to further improve the forming accuracy for the turning parts 12. It is also possible to immediately press the turning parts 12 that have been formed by the second clamp part 203 and the third clamp part 204, thereby simplifying the device and the process steps, without the necessity of providing a separate station for pressing.

Figure 30:
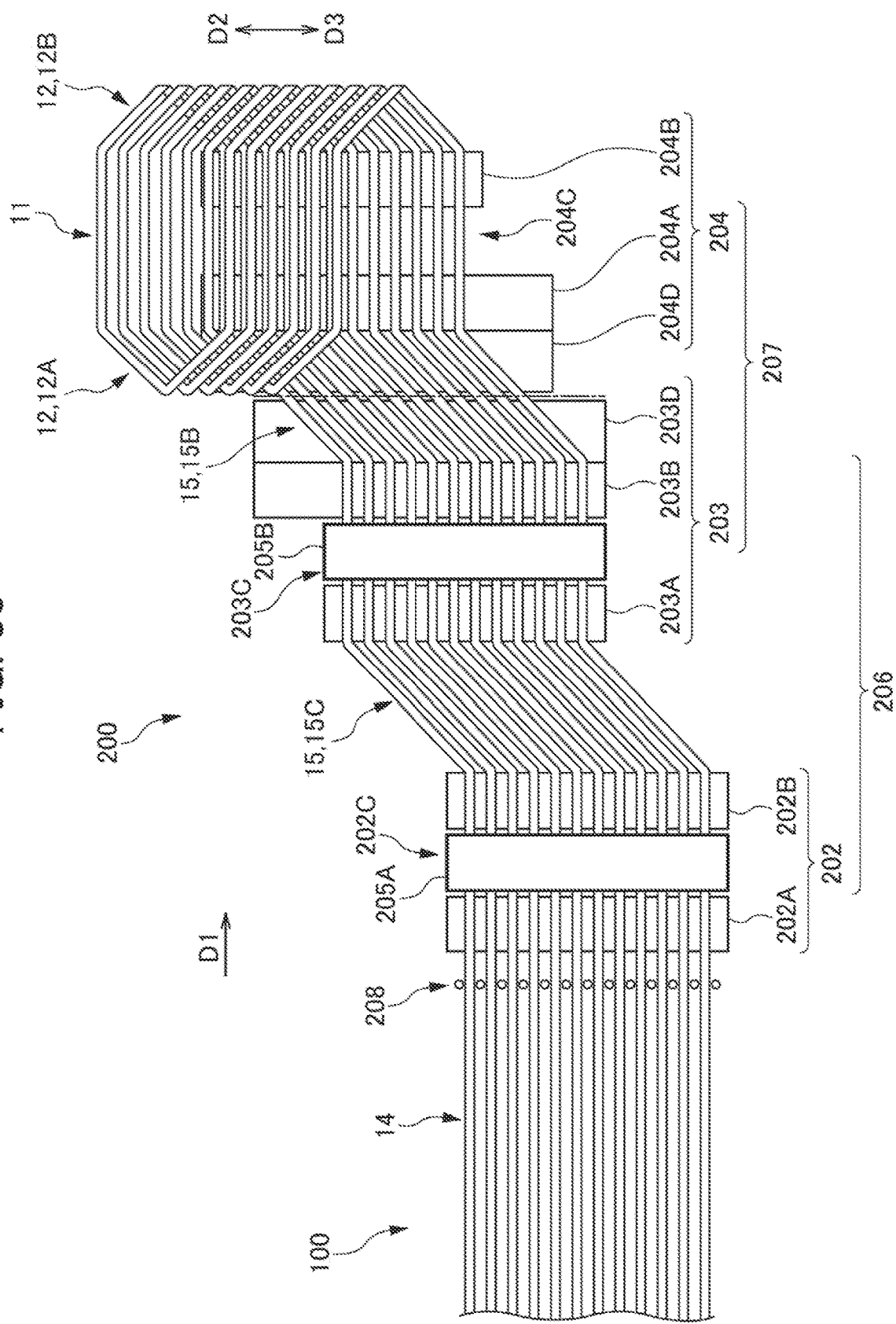
FIG. 30 is a plan view of the conductor forming device, illustrating a situation where next inclined parts are being formed on the group of conductors after the inclined parts are folded.

After the second turning parts 12B are formed, the holder 205 further conveys the group of conductors 100 in the D1 direction to dispose the secondly formed inclined parts 15B between the second clamp part 203 and the third clamp part 204. Thereafter, similar to the case illustrated in FIG. 24, third inclined parts 15 (inclined parts 15C) are formed on the straight parts 14 disposed between the first clamp part 202 and the second clamp part 203, as illustrated in FIG. 30.

Subsequent to the foregoing process, the folding step for the second inclined parts 15B, the inclined part forming step for forming the fourth inclined parts, the folding step for the third inclined parts 15C, and subsequent necessary steps are alternately and repeatedly executed in the same manner as described above until the wave winding coil 1 formed from the group of conductors 100 has a predetermined length corresponding to four turns around the stator core 20 Thus, the wave winding coil 1, which has a sheet shape forming eight layers (eight turns) and in which the in-slot disposition parts 11 are offset by an amount corresponding to six in-slot disposition parts 11 between two adjoining layers, is formed. Thus, in the wave winding coil 1 formed by the conductor forming device 200, where forming of the inclined parts 15 and folding of the inclined parts 15 are alternately repeated, formation errors that may occur when the coil wires 10 are folded are not accumulated in the inclined parts 15, Therefore, the in-slot disposition parts 11 and the turning parts 12 are formed with satisfactory forming accuracy.

When the coil wires 10 are formed from the plurality of unit wires 10a arranged in the thickness directions (the Y directions) as described in the present embodiment, it is inevitable that, when the inclined parts 15 are folded, a perimeter difference occurs among the unit wires 10a due to an angular difference between the extending directions and the folding direction of the inclined parts 15 before folding. In a case where all the inclined parts are formed beforehand as in the known art, there is a disadvantage that a perimeter difference that occurs at the time of the folding among the unit wires 10a affects the already formed inclined parts, causing shoulder bending parts of the formed inclined parts (starting points at which the inclined parts are bent) to be displaced. In contrast, alternately performing the inclined part forming step and the folding step as described in the present embodiment makes it possible to substantially cancel out, by way of forming of the next inclined parts 15, the adverse effects of a perimeter difference among the unit wires 10a caused by the folding. Therefore, even though the coil wires 10 are each formed from the plurality of unit wires 10a arranged in the thickness directions, it is possible to manufacture the wave winding coil 1 with improved forming accuracy.

Note that, the sheet-shaped wave winding coil 1 produced as described above has a two-layer structure where the in-slot disposition parts 11 overlap with each other, and further has, as illustrated in FIG. 1, the layer switching parts Ta at which the layers (turns) switch in the radial directions of the stator core 20, every length corresponding to one turn around the stator core 20. In the case of forming the wave winding coil 1 having this structure, in order to prevent layers from interfering with each other in the layer switching parts Ta, the folding step may include folding the inclined parts 15 corresponding to the layer switching parts Ta in a direction (an R2 direction) opposite to the previous folding direction (the R1 direction), as will be described below.

Figure 31:
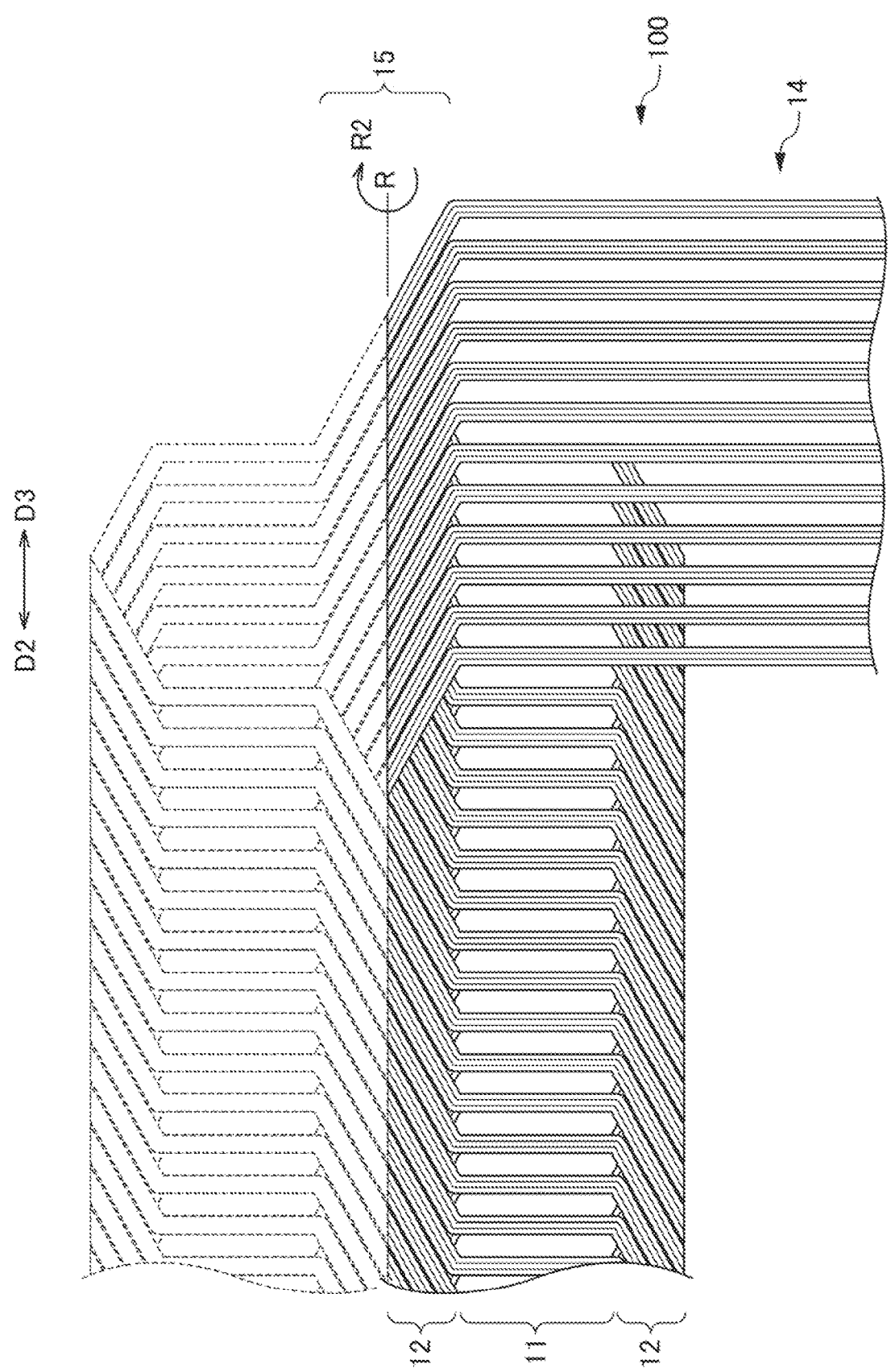
FIG. 31 is a plan view of the group of conductors, illustrating a situation where the inclined parts corresponding to layer switching parts are being folded back in an opposite direction.
Figure 32:
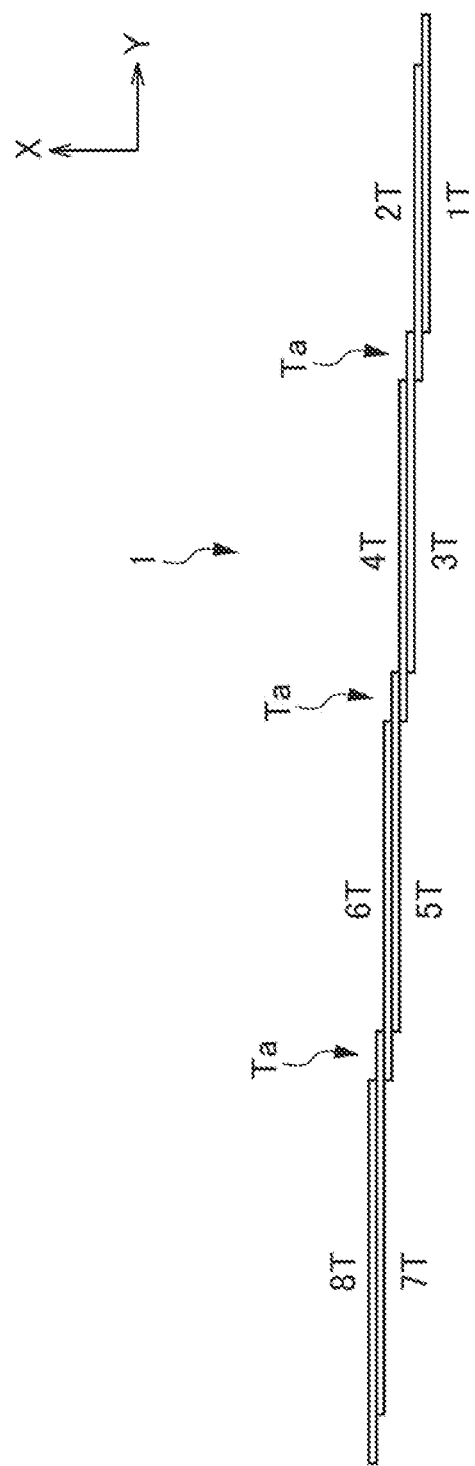
FIG. 32 is a plan view illustrating a sheet-shaped, wave winding coil formed from the group of conductors where the layer switching parts are folded back in the opposite direction.

As illustrated in FIG. 31, in the folding step where the inclined parts 15 corresponding to the layer switching parts Ta are folded along the folding line R, the inclined parts 15 are folded back in the opposite direction (the R2 direction) that is opposite to the folding direction (the R1 direction) of the inclined parts 15 in the previous folding step. Specifically, in the case of the wave winding coil 1 according to the present embodiment, as illustrated in FIG. 1, the layer switching parts Ta are present at three locations in total, i.e., between the seventh layer (7 T) and the sixth layer (6 T), between the fifth layer (5 T) and the fourth layer (4 T), and between the third layer (3 T) and the second layer (2 T). Accordingly, the inclined parts 15 are folded back in the opposite direction only in the folding step for the inclined parts 15 corresponding to the layer switching parts Ta, as described above. As a result, as illustrated in FIG. 32, in the layer switching parts Ta, an offset direction along one of the thickness directions of the turning parts 12 (the radial directions of the stator core 20, and the X directions in FIG. 32) is reversed, making it possible to prevent the layers from interfering with each other in the layer switching parts Ta when the wave winding coil 1 is attached to the stator core 20.

The sheet-shaped wave winding coil 1 described above does not require a common dominant technique in which a plurality of coil segments are formed, inserted into slots, and thereafter, coil ends of the coil segments are welded. Thus, it is not necessary to use, for example, a high-purity copper material for the coil to be subjected to heat process at weld points, making it possible to use recycled copper material containing impurities and contribute to achievement of the recycling and reusing of resources.

The wave winding coil 1 described above includes the six coil wires 10 arranged in parallel to each other, but the number of the coil wires 10 arranged in parallel is not limited to six, and the number may be appropriately increased or reduced. The coil wires 10 includes the three unit wires 10a arranged in parallel to each other, but the number of the unit wires 10a is not limited to three, and the number may also be appropriately increased or reduced. For example, the number of the unit wires 10a may be two or four or more.

The wave winding coil is not limited to one formed from the coil wires 10 formed into a substantial U-shape, and the wave winding coil may be formed by alternatively performing the inclined part forming step and the folding step on the straight coil wire.

In the above-described embodiment, as illustrated in FIGS. 11 to 15, the holding device 210 is configured to press the plurality of movable blocks 215 from one side in the D2-D3 directions to hold the plurality of straight parts 14 included in the group of straight parts of the plurality of coil wires 10, but this is a non-limiting example. For example, as can be seen from FIG. 33 illustrating a holding device 210A according to a modification, it may be configured to press the plurality of movable blocks 215 from both sides in the D2-D3 directions to hold the plurality of straight parts 14 included in the group of straight parts of the plurality of coil wires 10.

The holding device 210A of the modification illustrated in FIG. 33 has, in addition to the structure which is included in the holding device 210 of the above-described embodiment illustrated in FIGS. 11 to 15 and in which the plurality of movable blocks 215 are pressed from one side in the D2-D3 directions, a structure which is obtained by reversing the aforementioned structure and in which the plurality of movable blocks 215 are pressed from the other side in the D2-D3 directions, and thus, is configured to press the plurality of movable blocks 215 from both sides with respect to a center fixing part 219 to hold the plurality of straight parts 14, The description of the holding device 210 of the above-described embodiment can be incorporated by reference in the points not described in the description of the holding device 210A of the variant.

As illustrated in FIG. 33, in the holding device 210A of the modification, the center fixing part 219 is provided at the center in the D2-D3 directions. In the holding device 210A, each of the driving members 217A of the drive mechanisms 216A provided on both sides of the center fixing part 219 in the D2-D3 directions presses the plurality of movable links 218 toward the center fixing part 219 to thereby cause the plurality of movable blocks 215 to move toward the center fixing part 219 from both sides in the D2-D3 directions with respect to the center fixing part 219. This configuration makes it possible to hold the plurality of straight parts 14 included in the group of straight parts of the plurality of coil wires 10 in the grooves 214a of the fixed blocks 214 (see FIG. 12) by moving the plurality of movable blocks 215 toward the center fixing part 219.

EXPLANATION OF REFERENCE NUMERALS

10: Coil wire (Conductor)
14: Straight part
200: Conductor forming device
210: Holding device (Holder)
214: Fixed block
214a: Groove
214e: Fixed side contact part
215; Movable block
215h: Movable side contact part
216: Drive mechanism (Driver)
216a: Pressing adjustment spring (urging part)

What is claimed is:

1. A conductor forming device, comprising:
a holder that holds a plurality of straight parts of a plurality of conductors while arranging the plurality of straight parts in parallel to each other, the plurality of straight parts forming a group of straight parts of the plurality of conductors,
the holder comprising:
a fixed block on which a plurality of grooves are provided at equal intervals, the plurality of grooves each having a fixed side contact part capable of contacting with one end in width directions of the straight part;
a plurality of movable blocks that are disposed to be movable in the grooves on the fixed block, the plurality of movable blocks each having a movable side contact part capable of contacting with an opposite end in the width directions of the straight part; and
a driver capable of driving the movable blocks independently from each other.

2. The conductor forming device according to claim 1, further comprising:
urging parts each of which urges the plurality of movable blocks in an opposite direction to a direction in which the plurality of straight parts is pinched and pressed between the plurality of movable blocks and the fixed block,
wherein the driver drives each of the plurality of movable blocks against an urging force of the urging part.

\* \* \* \* \*